US009094933B2

(12) United States Patent
Horn et al.

(10) Patent No.: US 9,094,933 B2
(45) Date of Patent: Jul. 28, 2015

(54) WIRELESS COMMUNICATION PAGING UTILIZING MULTIPLE TYPES OF NODE IDENTIFIERS

(75) Inventors: Gavin B. Horn, La Jolla, CA (US); Osok Song, San Diego, CA (US); Parag A. Agashe, San Diego, CA (US); Rajarshi Gupta, Santa Clara, CA (US); Fatih Ulupinar, San Diego, CA (US); Ravindra M. Patwardhan, San Diego, CA (US); Rajat Prakash, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 720 days.

(21) Appl. No.: 12/352,501

(22) Filed: Jan. 12, 2009

(65) Prior Publication Data
US 2009/0181672 A1    Jul. 16, 2009

Related U.S. Application Data

(60) Provisional application No. 61/061,543, filed on Jun. 13, 2008, provisional application No. 61/020,973, filed on Jan. 14, 2008.

(51) Int. Cl.
*H04W 4/00* (2009.01)
*H04W 68/02* (2009.01)
(Continued)

(52) U.S. Cl.
CPC .............. *H04W 68/02* (2013.01); *H04W 60/00* (2013.01); *H04W 68/04* (2013.01); *H04W 84/045* (2013.01)

(58) Field of Classification Search
CPC ....... H04W 68/00; H04W 68/10; H04W 8/06; H04W 68/02; H04W 4/02
USPC .............. 455/433, 435.1–439, 443–446, 458; 370/331–334, 338
See application file for complete search history.

(56) References Cited

U.S. PATENT DOCUMENTS 5,305,466 A    4/1994 Taketsugu
5,822,694 A    10/1998 Coombes
(Continued)

FOREIGN PATENT DOCUMENTS

CN    1308479 A    8/2001
CN    101047977 A    10/2007
(Continued)

OTHER PUBLICATIONS

Wu X et al: "A Low-Cost, Low-Delay Location Update/Paging Scheme in Hierarchical Cellular Networks" Mobide 2003. Proceedings 3rd. ACM International Workshop on Data Engineering for Wireless and Mobile Access. San Diego, CA, Sep. 19, 2003; [International Workshop on Data Engineering for Wireless and Mobile Access. (Mobide)], New York, NY: ACM, US, Sep. 19, 2003; pp. 46-50, XP001217404.
(Continued)

*Primary Examiner* — Dai A Phuong
(74) *Attorney, Agent, or Firm* — Dalei Dong

(57) ABSTRACT

Paging load and/or registration load in a network is reduced by using different types of identifiers to specifying which nodes page an access terminal in the network. In some aspects, the network maintains a list that specifies that certain individual nodes (e.g., cells or sectors) are to page a given access terminal and/or that one or more zones (e.g., tracking areas) are to page the access terminal. In some aspects, an access terminal in a network may be configured to provide a forward-looking paging list to the network. The list provided by an access terminal may specify different types of node identifiers (e.g., individual node identifiers, subscriber groups, etc.). The network may then use the list to determine which nodes are to page a given access terminal such that when the access terminal moves to a different node, that node may already be configured to page the access terminal. In some aspect paging load and registration load are managed in a deployment that includes different types of access points. For example, access points of a first type (e.g., macro nodes) may provide service over relatively large coverage areas and access points of a second type (e.g., femto nodes) may provide service over smaller coverage areas and/or provide restricted service.

46 Claims, 17 Drawing Sheets

(51) Int. Cl.
*H04W 60/00* (2009.01)
*H04W 68/04* (2009.01)
*H04W 84/04* (2009.01)

(56) References Cited

U.S. PATENT DOCUMENTS

| | | | |
|---|---|---|---|
| 5,918,159 A | 6/1999 | Fomukong et al. | |
| 6,044,260 A | 3/2000 | Eaton et al. | |
| 6,138,035 A | 10/2000 | Tsujita | |
| 6,181,933 B1 | 1/2001 | Jeong | |
| 6,185,421 B1 | 2/2001 | Alperovich et al. | |
| 6,393,295 B1 | 5/2002 | Butler et al. | |
| 6,516,193 B1* | 2/2003 | Salmela et al. | 455/432.3 |
| 6,594,493 B1* | 7/2003 | Davies et al. | 455/436 |
| 6,704,024 B2 | 3/2004 | Robotham et al. | |
| 6,889,055 B1 | 5/2005 | Neufeld | |
| 7,180,877 B1* | 2/2007 | Benveniste | 370/329 |
| 7,395,075 B2 | 7/2008 | Posner et al. | |
| 7,558,226 B2 | 7/2009 | Anderson et al. | |
| 7,623,722 B2 | 11/2009 | Prentice et al. | |
| 7,949,337 B2* | 5/2011 | Choi | 455/440 |
| 8,041,354 B2* | 10/2011 | Aikawa et al. | 455/435.1 |
| 2001/0049282 A1 | 12/2001 | Ushiki et al. | |
| 2003/0125073 A1 | 7/2003 | Tsai et al. | |
| 2004/0098455 A1 | 5/2004 | Ellis et al. | |
| 2004/0125400 A1 | 7/2004 | De Graaff et al. | |
| 2004/0203777 A1 | 10/2004 | Watanabe et al. | |
| 2004/0203863 A1* | 10/2004 | Huomo | 455/456.1 |
| 2005/0037798 A1 | 2/2005 | Yamashita et al. | |
| 2005/0136930 A1* | 6/2005 | Dent | 455/445 |
| 2005/0186961 A1 | 8/2005 | Aikawa et al. | |
| 2005/0282562 A1* | 12/2005 | Lee et al. | 455/458 |
| 2006/0116124 A1 | 6/2006 | Signore et al. | |
| 2006/0133269 A1 | 6/2006 | Prakash et al. | |
| 2006/0198344 A1* | 9/2006 | Teague et al. | 370/337 |
| 2006/0270402 A1* | 11/2006 | Kubo | 455/425 |
| 2007/0032233 A1* | 2/2007 | Tajima et al. | 455/433 |
| 2007/0060175 A1 | 3/2007 | Park et al. | |
| 2007/0082683 A1* | 4/2007 | Na et al. | 455/456.1 |
| 2007/0104156 A1 | 5/2007 | Inoue et al. | |
| 2007/0105568 A1* | 5/2007 | Nylander et al. | 455/458 |
| 2007/0105600 A1* | 5/2007 | Mohanty et al. | 455/574 |
| 2007/0118740 A1 | 5/2007 | Deishi | |
| 2007/0202875 A1* | 8/2007 | Dorsey et al. | 455/434 |
| 2007/0202892 A1 | 8/2007 | Voyer | |
| 2007/0248032 A1 | 10/2007 | Vasudevan et al. | |
| 2008/0119199 A1* | 5/2008 | Hamano et al. | 455/455 |
| 2008/0298287 A1* | 12/2008 | Martinez-Perez et al. | 370/311 |
| 2009/0042587 A1* | 2/2009 | Kamdar et al. | 455/458 |
| 2009/0098890 A1 | 4/2009 | Vasudevan et al. | |
| 2009/0124255 A1* | 5/2009 | Okubo et al. | 455/435.1 |
| 2009/0181674 A1* | 7/2009 | Nguyen et al. | 455/436 |
| 2009/0182871 A1 | 7/2009 | Gupta et al. | |
| 2009/0258647 A1* | 10/2009 | Yamada et al. | 455/435.1 |
| 2009/0298516 A1* | 12/2009 | Ryu et al. | 455/458 |
| 2010/0069062 A1 | 3/2010 | Horn et al. | |
| 2010/0184458 A1 | 7/2010 | Fodor et al. | |
| 2011/0066971 A1 | 3/2011 | Forutanpour et al. | |
| 2011/0072121 A1* | 3/2011 | Takasugi et al. | 709/222 |
| 2011/0230189 A1* | 9/2011 | Okubo et al. | 455/435.1 |
| 2011/0263274 A1 | 10/2011 | Fox et al. | |
| 2012/0063416 A1* | 3/2012 | Kobayashi | 370/331 |

FOREIGN PATENT DOCUMENTS

| | | |
|---|---|---|
| CN | 101048007 A | 10/2007 |
| EP | 1662824 | 5/2006 |
| EP | 1843616 | 10/2007 |
| GB | 2243976 | 11/1991 |
| JP | 053581 | 1/1993 |
| JP | 5003581 A | 1/1993 |
| JP | H0879824 A | 3/1996 |
| JP | 8294165 A | 11/1996 |
| JP | 10051846 A | 2/1998 |
| JP | 11331918 A | 11/1999 |
| JP | 2004312589 A | 11/2004 |
| JP | 2005269230 A | 9/2005 |
| JP | 2006325231 A | 11/2006 |
| JP | 2007251937 A | 9/2007 |
| JP | 2009510972 A | 3/2009 |
| WO | 9940751 | 8/1999 |
| WO | WO-2004114703 A1 | 12/2004 |
| WO | 2007040452 | 4/2007 |

OTHER PUBLICATIONS

International Search Report—PCT/US09/030857, International Search Authority—European Patent Office—May 28, 2009.
Written Opinion—PCT/US09/030857, International Search Authority—European Patent Office—May 28, 2009.
Berruto E: "Research Activities on UMTS Radio Interface, Network Architectures,and Planning" IEEE Communications Magazine, IEEE Service Center, Piscataway, US, vol. 36, No. 2, Feb. 1, 1998, pp. 82-95, i XP000740416 ISSN: 0163-6804.
Bluetooth Specification Version 2.1 +EDR [vol. 1], published Jul. 26, 2007, by the Promoter Members of Bluetooth SIG, Inc.
Mitsubishi Electric: "Self-optimization of assigned TA list form reported list of last visited TAs", 3GPP TSG SA WG2 Meeting #59 S2-073219, Aug. 27-31, 2007, pp. 1-5.
Taiwan Search Report—TW098101154—TIPO—Mar. 9, 2013.
Taiwan Search Report—TW098101154—TIPO—Feb. 9, 2012.
TSG RAN WG2: "LS on Closed Subscriber Groups for LTE Home cells," 3GPP TSG RAN WG2 Meeting #58bis, R2-072991, 2007, 2 Pages, http://www.3gpp.org/ftp/tsg_ran/wg2_rl2/TSGR2_58bis/Docs/R2-072991.zip.

* cited by examiner

WIRELESS COMMUNICATION PAGING UTILIZING MULTIPLE TYPES OF NODE IDENTIFIERS

CLAIM OF PRIORITY UNDER 35 U.S.C. §119

This application claims the benefit of and priority to commonly owned U.S. Provisional Patent Application No. 61/020,973, filed Jan. 14, 2008, and U.S. Provisional Patent Application No. 61/061,543, filed Jun. 13, 2008, the disclosure of each of which is hereby incorporated by reference herein.

CROSS-REFERENCE TO RELATED APPLICATION

This application is related to concurrently filed and commonly owned U.S. patent application Ser. No. 12/352,507, entitled "WIRELESS COMMUNICATION PAGING AND REGISTRATION UTILIZING MULTIPLE TYPES OF NODE IDENTIFIERS," the disclosure of which is hereby incorporated by reference herein.

BACKGROUND

1. Field

This application relates generally to wireless communication and more specifically, but not exclusively, to improving communication performance.

2. Introduction

Wireless communication systems are widely deployed to provide various types of communication (e.g., voice, data, multimedia services, etc.) to multiple users. As the demand for high-rate and multimedia data services rapidly grows, there lies a challenge to implement efficient and robust communication systems with enhanced performance.

To supplement conventional mobile phone network base stations, small-coverage base stations may be deployed (e.g., installed in a user's home) to provide more robust indoor wireless coverage to mobile units. Such small-coverage base stations are generally known as access point base stations, Home NodeBs, or femto cells. Typically, such small-coverage base stations are connected to the Internet and the mobile operator's network via a DSL router or a cable modem.

In some femto cell deployments there may be a large number of femto cells in the territory covered by a macro cell. In such a case, the overhead associated with managing connectivity between mobile units and the base stations in the network may be relatively high. Thus, there is a need for improved resource management for wireless networks.

SUMMARY

A summary of sample aspects of the disclosure follows. It should be understood that any reference to the term aspects herein may refer to one or more aspects of the disclosure.

The disclosure relates in some aspect to managing paging load in a network. In some aspects, a network may use different types of identifiers for specifying which nodes page an access terminal. For example, a first type of identifier may comprise an identifier of an individual node, a cell identifier, or a shared identifier (e.g., an identifier of a subscriber group) and a second type of identifier may relate to a zone (e.g., a tracking area), a subscriber group, or a location. Thus, the network may maintain a list that specifies that certain individual nodes (e.g., cells or sectors) should page a given access terminal and/or that one or more zones (e.g., tracking areas) should page the access terminal.

By using different types of identifiers, the network may more efficiently page the access terminals. For example, the network may page low mobility access terminals in a smaller area and with greater granularity than high mobility access terminals. Similarly, the network may page access terminals that tend to be paged more frequently in a smaller area and with greater granularity than access terminals that tend to be paged less frequently.

The disclosure relates in some aspect to managing registration load in a network. In some aspects, an access terminal in a network may be configured to provide a forward-looking paging list (e.g., a suggested paging set) to an entity that controls paging for the network (e.g., a mobility manager). Here, an access terminal may estimate where it may need to be paged in the future so it may provide a list that includes an indication of where the access terminal wishes to be paged. The network may then determine which nodes are to page the access terminal based on the list. In some aspects, the forward-looking list may be used in addition to a standard paging set (e.g., tracking area-based, zone-based, distance-based) that is implemented by a network. Thus, an access terminal may be paged according to standard paging rules and the list generated by the access terminal. Use of such a list may provide more efficient registration since, when a given access terminal moves to a different node, that node may already be configured to page the access terminal. Consequently, the access terminal will not need to register at that node to receive pages from the node. Also, by using different types of identifiers, a given access terminal may specify with more granularity the nodes that are to page the access terminal.

The disclosure relates in some aspect to managing paging load and/or registration load in a deployment that includes different types of access points. For example, access points of a first type (e.g., macro nodes) may provide service over relatively large coverage areas and access points of a second type (e.g., femto nodes) may provide service over smaller coverage areas and/or provide restricted service. In such a case, the use of different types of identifiers for paging and registration enables greater granularity in specifying which nodes may page a given access terminal.

BRIEF DESCRIPTION OF THE DRAWINGS

These and other sample aspects of the disclosure will be described in the detailed description and the appended claims that follow, and in the accompanying drawings, wherein:

Figure 1:
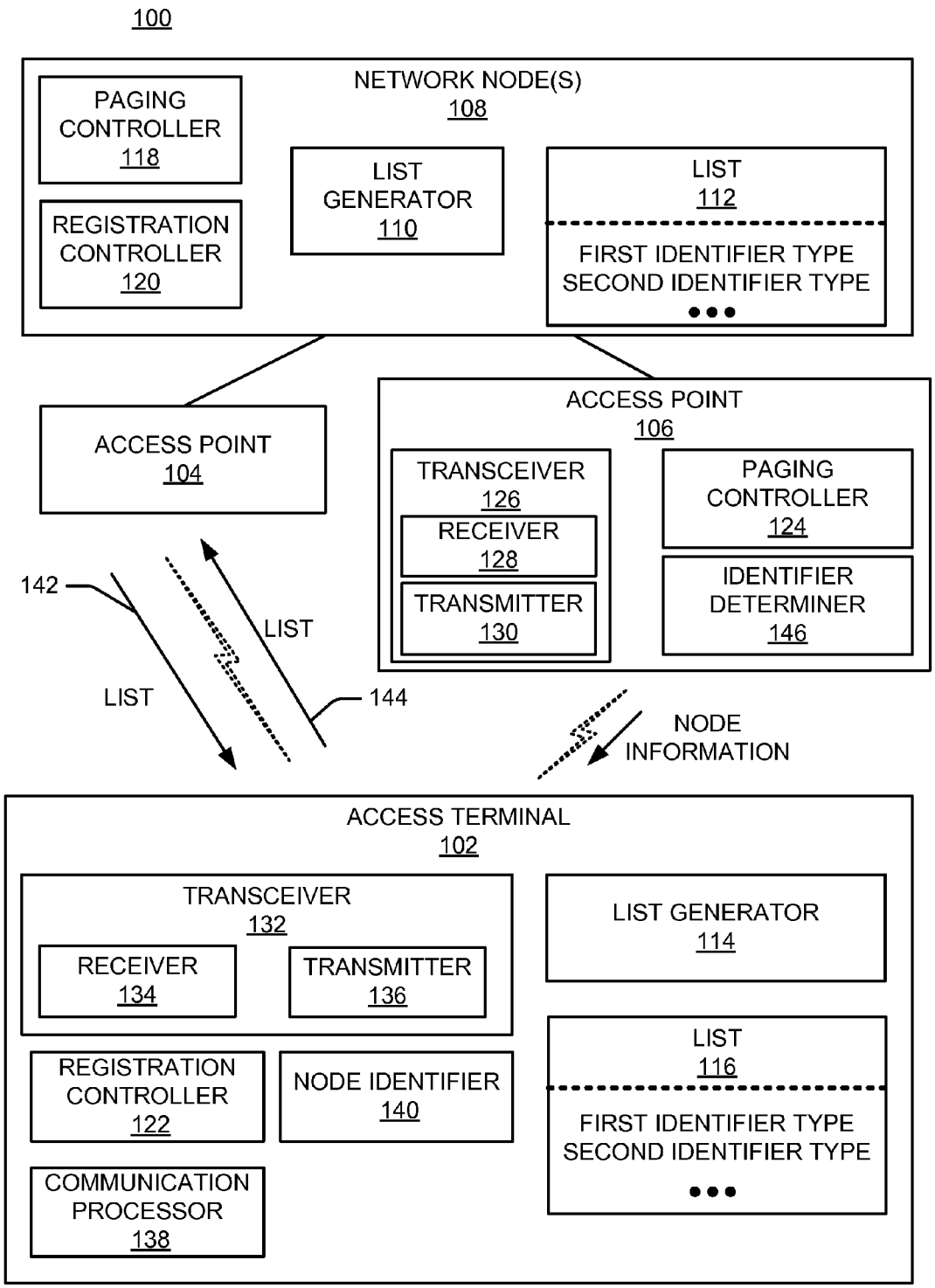
FIG. 1 is a simplified block diagram of several sample aspects of a communication system configured to use multiple types of identifiers for wireless communication paging and/or registration.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes in a sample communication system 100 (e.g., a portion of a communication network). For illustration purposes, various aspects of the disclosure will be described in the context of one or more access terminals, access points, and network nodes that communicate with one another. It should be appreciated, however, that the teachings herein may be applicable to other types of apparatuses or other similar apparatuses that are referenced using other terminology.

Access points 104 and 106 in the system 100 provide one or more services (e.g., network connectivity) for one or more wireless terminals (e.g., access terminal 102) that may reside within or that may roam throughout an associated geographical area. In addition, the access points 104 and 106 may communicate with one or more network nodes (represented, for convenience, by network node 108) to facilitate wide area network connectivity. Such network nodes may take various forms such as, for example, one or more radio and/or core network entities (e.g., mobility management entities, session reference network controllers, or some other suitable network entity or entities).

FIG. 1 and the discussion that follows describe various schemes where a network node and/or an access terminal provides a list of identifiers that may be used in conjunction with determining which access points page the access terminal and whether the access terminal needs to register at a given access point. For example, in FIG. 1 the network node 108 includes a list generator 110 that provides a list 112. Similarly, the access terminal 102 includes a list generator 114 that provides a list 116. Here, a page is an explicit message from a network to a specific node, indicating that the network wants the specified node to establish communication with the network.

The network node 108 uses the list 112 to specify the access points that are to page an access terminal. For example, when the access terminal 102 needs to be paged, the network node 108 (e.g., a paging controller 118) sends a page request to every access point identified by the list 112 (e.g., a specific list that is defined for the access terminal 102).

The network node 108 also may send the list to the access terminal 102. For example, when the access terminal 102 registers at an access point in the system 100, the network node 108 (e.g., a registration controller 120) receives a corresponding registration request. The registration controller 120 may then send the list 112 to the access terminal 102 so that the access terminal 102 may determine which access points will page the access terminal. In this way, the access terminal 102 may determine whether it needs to register at a given access point to receive pages from that access point.

Also in conjunction with registration, the access terminal 102 may send the list 116 to the network node 108 to assist the network node 108 (e.g., the list generator 110) in providing the list 112. For example, the list 116 may comprise a forward-looking list that identifies any access points that the access terminal 102 is likely to idle on in the near future. Through the use of such a forward-looking list, the access terminal 102 may not need to register as often as it travels through the system 100 since many of the access points that the access terminal 102 eventually idles on will already be configured to page the access terminal 102.

Here, each list may comprise more than one type of identifier (e.g., two, three or more identifier types as represented by the ellipsis in the lists 112 and 116). For example, a first type of identifier may comprise an identifier of an individual node, a cell identifier, or a shared identifier (e.g., an identifier of a subscriber group). In addition, a second type of identifier may relate to a zone (e.g., a tracking area), a subscriber group, or a location. Other types of identifiers may be employed in various implementations.

In some aspects, the paging load and/or the registration load in a network may be reduced by using these different types of identifiers. For example, by using identifiers of the first type, paging of an access terminal may be limited to a relatively small number of access points in cases where the access terminal does not need to be paged over a large area. Several examples of how different types of identifiers may be advantageously used to reduce paging load and/or registration load in a mixed deployment follow.

In some aspects, paging and registration schemes as taught herein may be used in a mixed deployment that includes macro coverage (e.g., a large area cellular network such as a 3G network, typically referred to as a macro cell network or a Wide Area Network—WAN) and smaller coverage (e.g., a residence-based or building-based network environment, typically referred to as a Local Area Network—LAN). Here, as an access terminal ("AT") moves through such a network, the access terminal may be served in certain locations by access points that provide macro coverage while the access terminal may be served at other locations by access points that provide smaller area coverage. In some aspects, the smaller area coverage nodes may be used to provide incremental capacity growth, in-building coverage, and different services, all leading to a more robust user experience.

In the description herein, a node that provides coverage over a relatively large area may be referred to as a macro node while a node that provides coverage over a relatively small area (e.g., a residence) may be referred to as a femto node. It should be appreciated that the teachings herein may be applicable to nodes associated with other types of coverage areas. For example, a pico node may provide coverage over an area that is smaller than a macro area and larger than a femto area (e.g., coverage within a commercial building). In various applications, other terminology may be used to reference a macro node, a femto node, or other access point-type nodes. For example, a macro node may be configured or referred to as an access node, base station, access point, eNodeB, macro cell, and so on. Also, a femto node may be configured or referred to as a Home NodeB, Home eNodeB, access point base station, femto cell, and so on. In some implementations, a node may be associated with (e.g., divided into) one or more cells or sectors. A cell or sector associated with a macro node, a femto node, or a pico node may be referred to as a macro cell, a femto cell, or a pico cell, respectively. A simplified example of how femto nodes may be deployed in a network is provided in FIG. 2.

Figure 2:
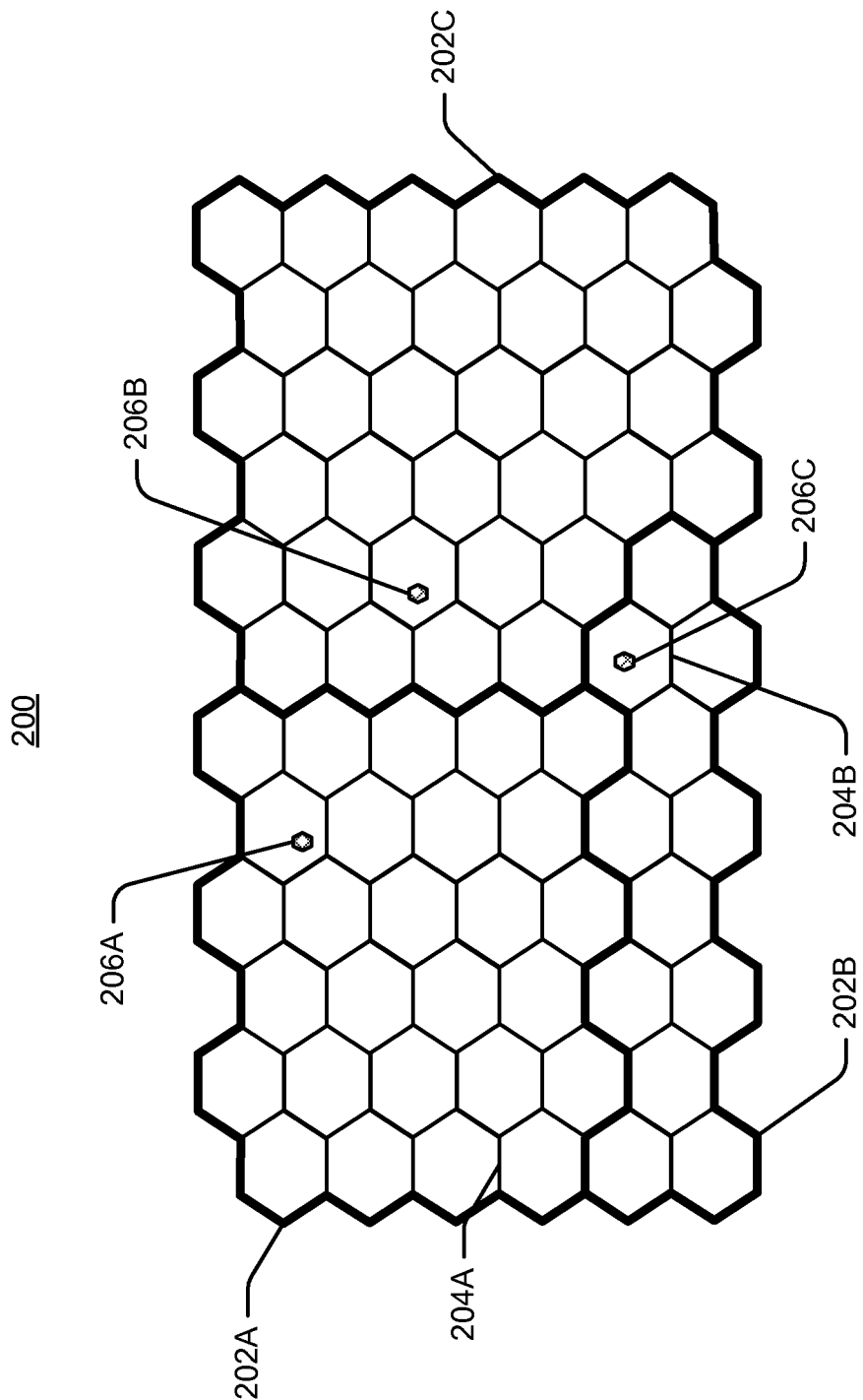
FIG. 2 is a simplified diagram illustrating sample wireless communication coverage areas.

FIG. 2 illustrates an example of a coverage map 200 where several tracking areas 202 (or routing areas or location areas) are defined, each of which includes several macro coverage areas 204. Here, areas of coverage associated with tracking areas 202A, 202B, and 202C are delineated by the wide lines and the macro coverage areas 204 are represented by the hexagons. The tracking areas 202 also include femto coverage areas 206. In this example, each of the femto coverage areas 206 (e.g., femto coverage area 206C) is depicted within a macro coverage area 204 (e.g., macro coverage area 204B). It should be appreciated, however, that a femto coverage area 206 may lie partially within or outside of a macro coverage area 204. Also, one or more pico coverage areas (not shown) may be defined within one or more tracking areas 202 or macro coverage areas 204. It should be appreciated that there could be multiple femto coverage areas within a macro coverage area, either within it or straddling across boundaries with adjacent macro cells.

In accordance with the teachings herein, paging load may be reduced in a mixed deployment by limiting the number of access points that page an access terminal when it is in idle mode. Such a mixed deployment may consist of, for example, a low mobility underlay of access points such as femto nodes (e.g., Home eNodeBs) and pico nodes (e.g., pico eNodeBs) and a high mobility overlay network of access points such as macro nodes (e.g., macro eNodeBs).

Paging load in a mixed deployment may be reduced in some aspects by enabling an access terminal to provide a list to the network (e.g., similar in some aspects to a tracking area identifier list in a tracking area update access message in LTE), whereby the list includes different types of identifiers. As discussed herein, such identifiers may include, for example, cell identifiers such as global cell identifiers ("GCIs"), as well as zone identifiers such as tracking area identifiers ("TAIs"). In a mixed deployment, there may be many idle mode handovers from the underlay access points to the neighboring overlay access points and vice versa due to, for example, lack of coverage of the underlay access points or the presence of restricted nodes (e.g., closed subscriber group cells). It is therefore desirable to have both underlay access points and overlay access points in the list so that the access points may be referenced with a desired degree of granularity.

In a mixed deployment, the network (e.g., a mobility management entity, MME) may page low mobility access terminals that last registered on a femto node in a relatively small area. Conversely, the network may page high mobility access terminal in a larger area. Similarly, the network may support different paging areas for access terminals with different types of application paging requirements. For example, the network may page access terminals that tend to be paged more frequently in a relatively small area. Conversely, the network may page access terminals with a smaller paging load in a larger area.

The disclosure relates in some aspects to reducing paging load in a mixed deployment when an access terminal registers at a macro node. In such a case, paging on the underlay network is avoided or limited to avoid paging the relatively large number of access points that may exist on the underlay network.

The disclosure relates in some aspects to reducing paging load in a mixed deployment when an access terminal registers at an access point on the underlay network. In this case, paging at distance macro nodes on the overlay network is avoided or limited since such an access terminal may likely have relatively low mobility (e.g., the access terminal may be at its home femto node).

For example, if a zone (e.g., tracking area) covers a large number of overlay access points, it may be preferable for a low mobility access terminal that registers at an underlay access point to only be paged in a subset of the tracking area (e.g., page the access terminal at individual cells in a tracking area). To facilitate paging at such a subset, in some cases different identifiers (e.g., TAIs) may be assigned to each of the access points on the overlay and underlay networks. For example, in FIG. 2 each of the femto coverage areas 206 may be assigned a unique TAI (each of which is different than the TAIs assigned to the tracking areas 202).

In cell-based paging, a cell may be a macro node that is part of a large tracking area as shown in FIG. 2, or it may be a femto node or a pico node. In accordance with the teachings herein, each cell may have two or more levels of membership for paging in the list (e.g., a TAI list). For example, a cell may be associated with a zone (e.g., tracking area) to allow paging of an access terminal over a large number of cells. In addition, a cell may be associated with cell identifier (e.g., GCI) to allow paging of an access terminal only at that cell. This allows the network the flexibility of paging an access terminal in a larger or smaller region to optimize paging load in the network.

In some implementations, when high granularity identifiers (e.g., GCIs) are used in the list, several alternative list options may be employed for identifying underlay nodes for registration. In a first option, the TAI is used and made large enough to support a unique TAI per underlay access point (e.g., HeNB and Pico eNB). In a second option, a special tracking area code ("TAC") may be used for each underlay access point to indicate that such an access point only pages based on GCI. The TAC may be much smaller in the second option since it may only be needed for overlay access points (e.g., Macro eNodeBs). In a third option, lower granularity identifiers (e.g., zones such as TAIs) are used for macro nodes and higher granularity identifiers (e.g., cell identifiers) are used for femto nodes and/or pico nodes.

In accordance with the teachings herein, registration load may be reduced in a mixed deployment by limiting the number of registration-related operations (e.g., tracking area updates) performed by an access terminal while operating in idle mode. As mentioned above, there may be many idle mode handovers between underlay access points and overlay access points in a mixed deployment as an access terminal selects between underlay access points and overlay access points while in idle mode.

Registration load in such a mixed deployment may be reduced in some aspects by improving a paging list (e.g., a TAI list in a tracking area update accept message in LTE) provided by the network (e.g., an MME). Such a list may be improved, for example, using one or more the following techniques: configuration using OAM (i.e., more accurate planning); the network learning from access terminal mobility events such as handovers and tracking area update request messages about the RF neighbors in the deployment; and access terminal assistance such as providing a list when the access terminal sends a tracking area update request message.

Although the first two techniques may improve the list provided by the network, acquiring some information that may be used to improve the list may involve access terminal assistance. For example, the macro node and femto node neighbors that an access terminal may hear and the level of mobility of an access terminal may not be known to the network when forming the list. Similarly, the network may need access terminal assistance to determine the presence of nearby femto nodes or pico nodes when the access terminal updates the tracking area at a macro node. For example, the granularity of the coverage at a macro node may not be sufficient to determine which femto nodes and pico nodes are near the access terminal when the access terminal registers (e.g., performs a tracking area update) at the macro node.

The disclosure relates in some aspects to providing a forward-looking list that may provide a rough indication of where an access terminal is going in an effort to reduce how often the access terminal has to register (e.g., update a tracking area). For example, an access terminal may remember the macro node that provides macro coverage at the home femto node of the access terminal. In this case, whenever the access terminal determines that it is within the coverage area of that macro node, the access terminal may include an identifier (e.g., TAI) of its home femto node in the list the access terminal sends to the network. In this way, the access terminal may not have to register (to update the tracking area) in the event the access terminal subsequently selects (e.g., idles on) its home femto node. As another example, an access terminal may add to its list identifiers (e.g., TAIs) of the macro nodes and femto nodes that the access terminal sees in the neighborhood but has not necessarily visited. Similarly, the access terminal may add to the list any neighbors advertised by nearby nodes (e.g., femto nodes and pico nodes). Through the use of these and other similar procedures, an access terminal may provide a list of identifiers to the network in conjunction with registration (e.g., when the access terminal sends a tracking area update request message). The network may then use this list to generate the list (e.g., TAI list) returned by the network. In some cases, the network may improve the list on its own by, for example, discovering neighbor lists provided by femto nodes and pico nodes in the vicinity of an access terminal.

In some cases, information regarding the zone (e.g., tracking area) last visited by an access terminal not provide sufficient granularity to determine whether any femto nodes and pico nodes are nearby when the access terminal registers. In such cases, the last visited zone may instead be described at a lower granularity. For example, the access terminal may use cell identifiers (e.g., GCI) to describe individual nodes in the zone that the access terminal last visited. The list provided by the access terminal may thus include different types of identifiers (e.g., GCIs and TAIs). In some cases, the network may convert an identifier in the list received from the access terminal to a different form of identifier. For example, the network may convert a cell identifier to a zone if the network wishes to page over a wider area. In any event, the list ultimately provided by the network (e.g., provided in a list in a tracking area update accept message) may include one or more types of identifiers (e.g., GCIs and TAIs) based on the paging decision may be the network.

Figure 4:
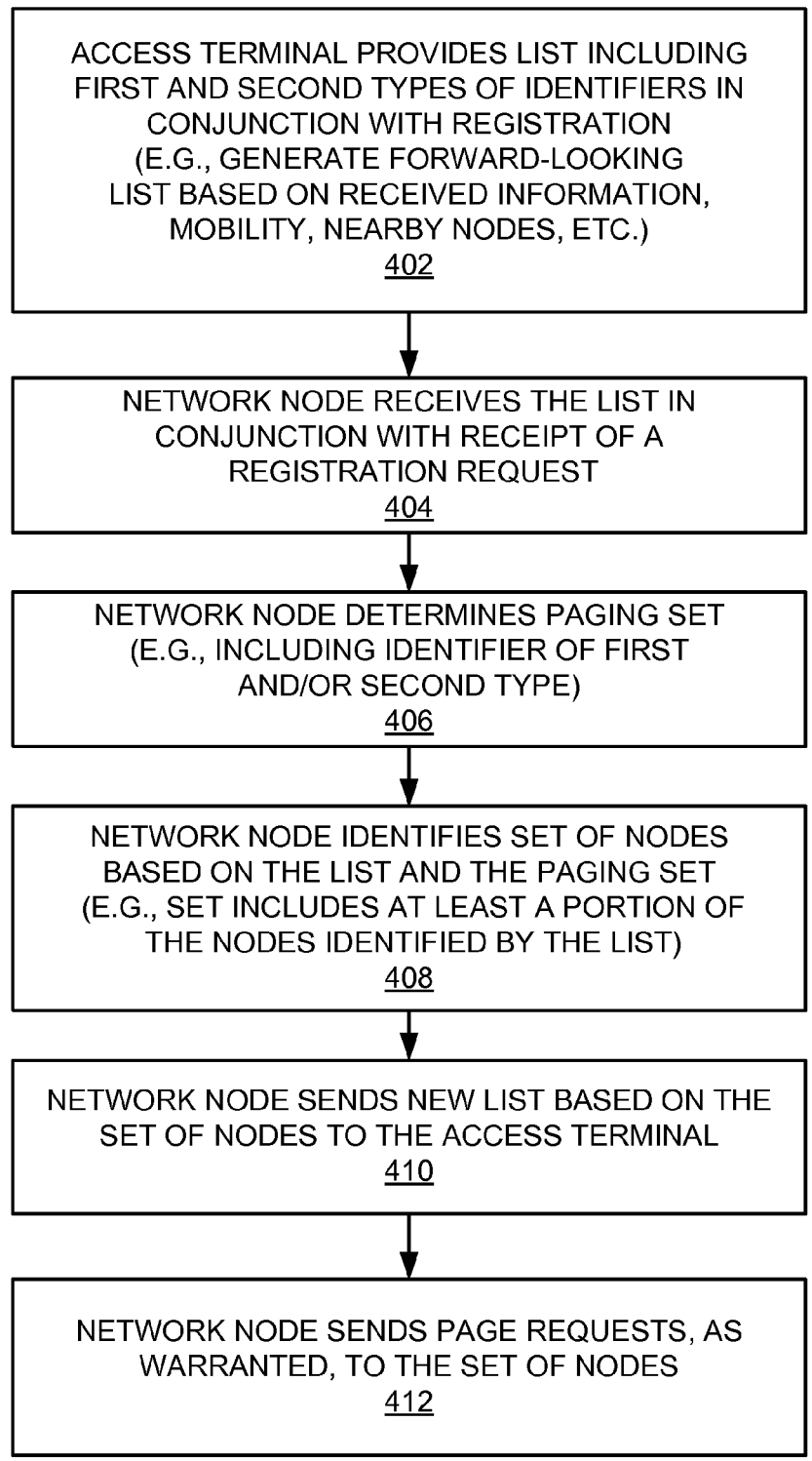
FIG. 4 is a flowchart of several sample aspects of operations that may be performed in conjunction with a node such as an access terminal providing a list including different types of identifiers.
Figure 5:
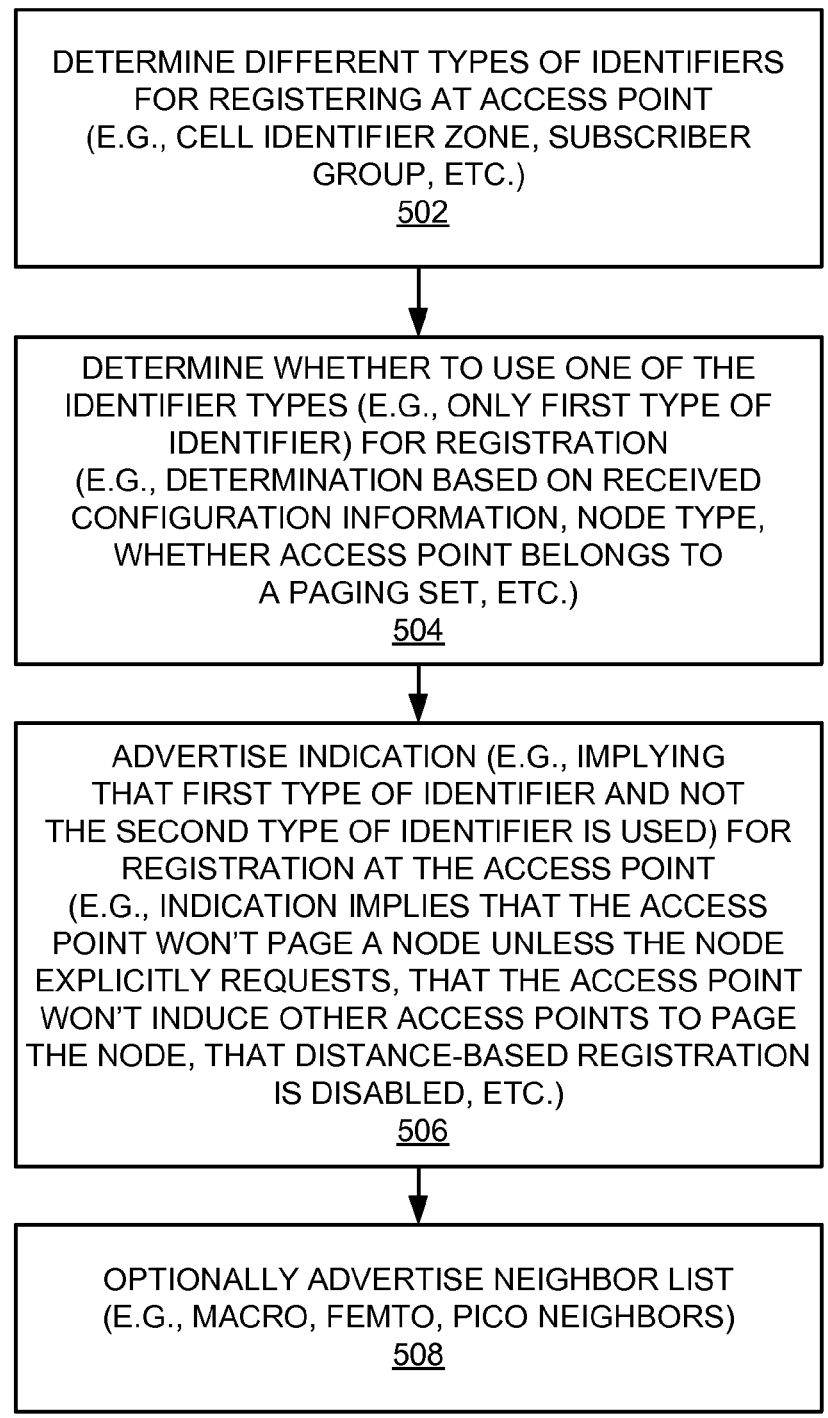
FIG. 5 is a flowchart of several sample aspects of operations that may be performed by a node that advertises an indication that a certain type of identifier is to be used for registration.
Figure 6:
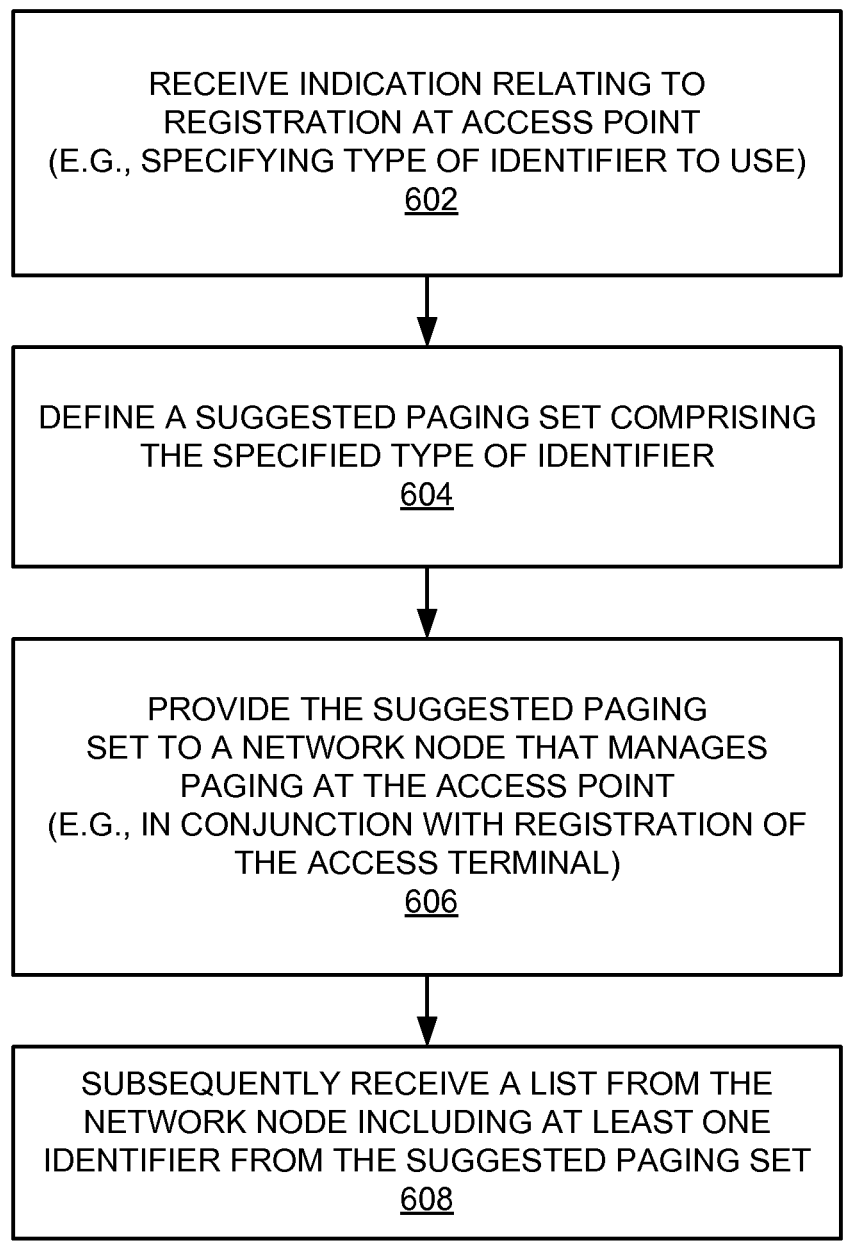
FIG. 6 is a flowchart of several sample aspects of operations that may be performed by a node that receives an indication that a certain type of identifier is to be used for registration.
Figure 7:
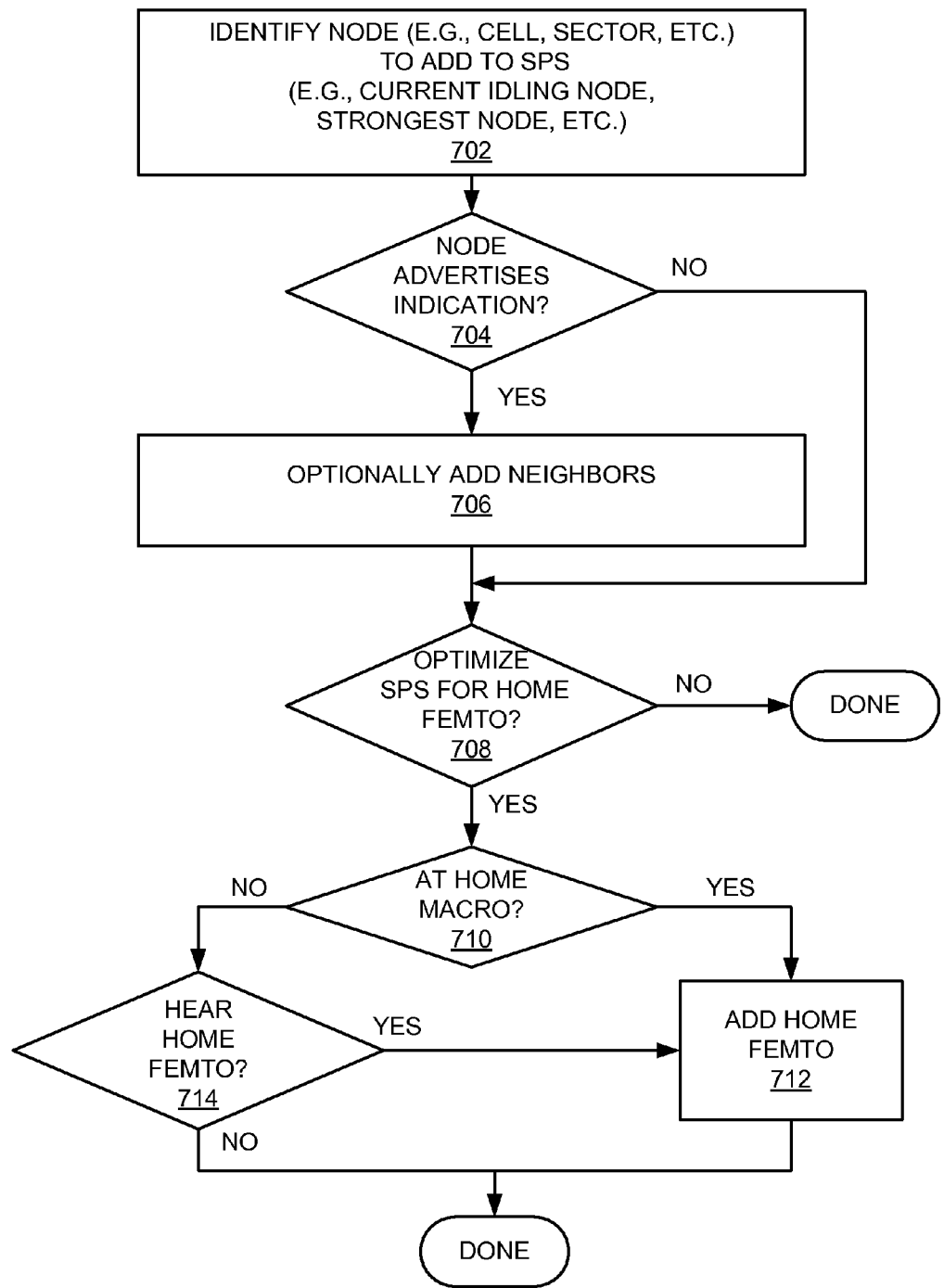
FIG. 7 is a flowchart of several sample aspects of operations that may be performed by a node to provide a suggested paging set.

With the above in mind, sample paging-related and registration-related operations will now be discussed in more detail in conjunction with the flowcharts of FIGS. 3A-7. Briefly, FIGS. 3A and 3B describe sample operations where a network node provides a list including different types of identifiers to an access terminal. FIG. 4 describes sample operations where an access terminal provides a list including different types of identifiers to a network node. FIGS. 5 and 6 describe sample operations where an access point advertises an indication that a certain type of identifier is to be used for registration and where an access terminal receives such an indication. FIG. 7 describes sample operations where an access terminal provides a suggested (or supplemental) paging set ("SPS").

For convenience, the operations of FIGS. 3A-7 (or any other operations discussed or taught herein) may be described as being performed by specific components (e.g., components of the system 100). It should be appreciated, however, that these operations may be performed by other types of components and may be performed using a different number of components. It also should be appreciated that one or more of the operations described herein may not be employed in a given implementation.

Figure 3A:
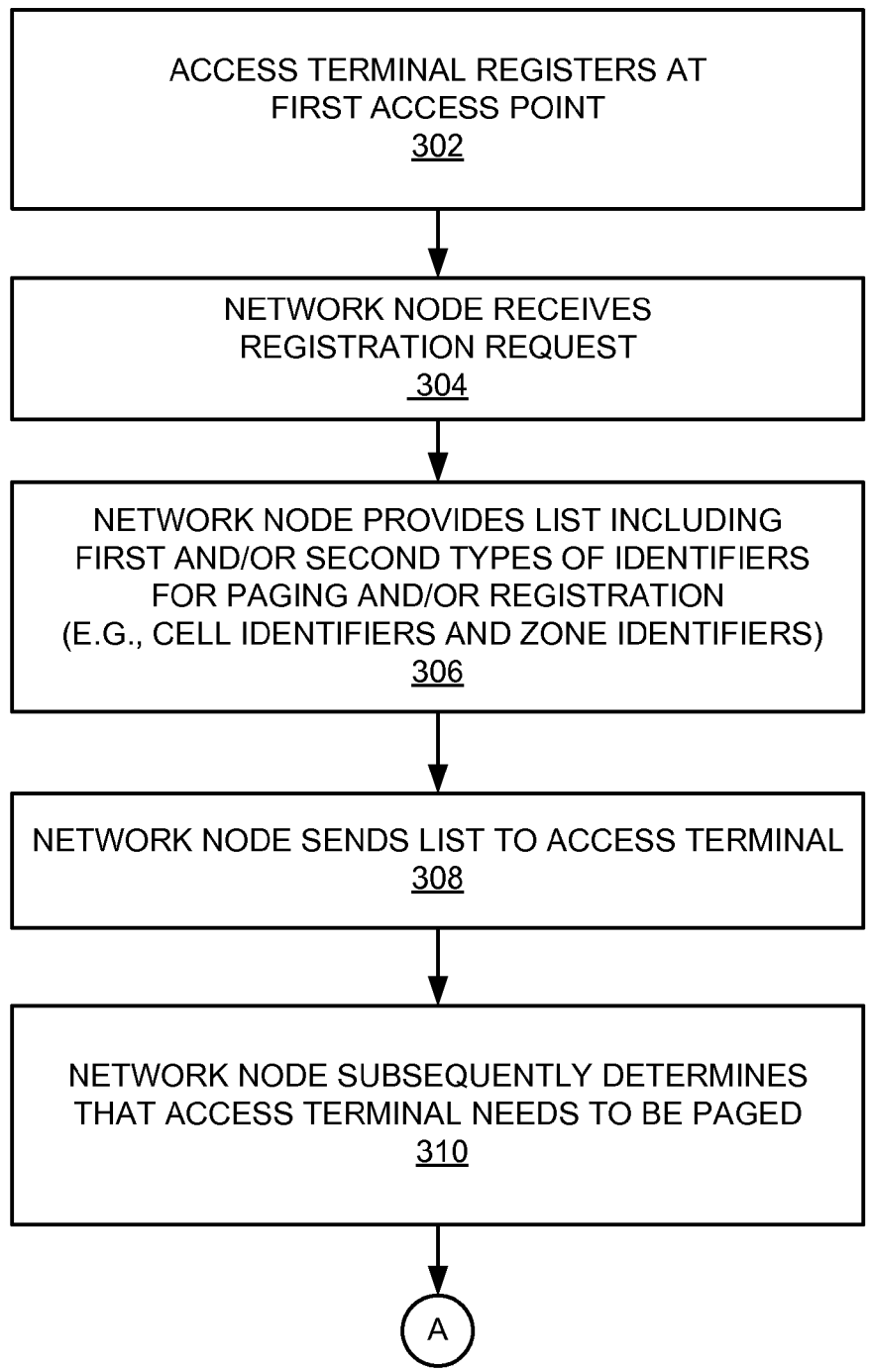
FIGS. 3A and 3B are a flowchart of several sample aspects of operations that may be performed in conjunction with a network providing a list including different types of identifiers.

Referring initially to FIG. 3A, as represented by block 302, at some point in time an access terminal in a network registers at an access point. For example, in FIG. 1 a registration controller 122 of the access terminal 102 may send a registration message to a transceiver (not shown) of the access point 104.

As represented by block 304, the network node 108 may receive a registration request as a result of the registration of the access terminal 102. For example, in FIG. 1 the access point 104 may send a registration request to the registration controller 120 (e.g., via a backhaul).

As represented by block 306, the network node 108 (e.g., the list generator 110) provides a list of identifiers (e.g., list 112 stored in a data memory) that may be used in conjunction with paging and/or registration operations of the nodes of the system 100. In particular, the list 112 may comprise a paging set that identifies (directly or indirectly) one or more access points that are to page the access terminal 102. In some implementations this may involve identifying the access points that will page the access terminal 102 according to the network's standard paging rules (e.g., tracking area-based rules, zone-based rules, distance-based rules).

As discussed herein, the list 112 may include different types of identifiers. As a specific example, a first type of identifier may comprise an identifier of an individual node (e.g., a cell identifier or a sector identifier) or an identifier of a subscriber group (e.g. a closed subscriber group). In addition, a second type of identifier may relate to a zone (e.g., the identifier may comprise a tracking area identifier, a location area identifier, a routing area identifier, and so on), a subscriber group (e.g., the identifier may comprise an identifier of a subscriber group), a location of an access terminal, and so on. Other types of identifiers may be employed in various implementations.

The list generator 110 may generate the list 112 in various ways and based on various criteria. Several examples of how the list 112 may be generated follow. It should be appreciated that the list 112 may be generated based on one or more of these techniques and other techniques.

In some aspects the list 112 may be generated based on where the access terminal 102 last registered or previously established a connection (e.g., based on the identity of the node where the registration or connection occurred, a last known paging zone or subscriber set of the access terminal 102, etc.). For example, the list generator 110 may maintain a database from which the list generator 110 may determine neighbors (e.g., neighboring nodes or zones) of a given node, zone, tracking area, subscriber set, and so on. Alternatively, the network node 108 may communicate with a given node to obtain a neighbor list from that node. The list generator 110 may then add identifiers (e.g., zones, node identifiers, etc.) associated with these neighbors to the list 112. In some aspects, if the access terminal 102 is registered at a macro node, the list generator 110 may exclude any nodes from an underlay network (e.g., femto nodes and pico nodes) from the list 112. Conversely, if the access terminal is registered at a femto node or pico node, the list generator 110 may exclude from the list 112 any macro nodes that are not immediate neighbors of the femto node or pico node.

In some aspects the list 112 may be generated based on a location of the access terminal 102. For example, the list generator 110 may determine the location of the access terminal 102 (e.g., based on signal from the access terminal 102) and elect to sends page requests to the access points near that location. Thus, in this case, identifiers of zones or node in that vicinity may be added to the list 112. In some aspects the location of the access terminal 102 may be estimated based on where the access terminal 102 last registered or based on a last known paging zone of the access terminal 102.

In some aspects the entries in the list 112 may be based on the mobility of the access terminal 102. Here, the list generator 110 may be configured to determine the mobility of the access terminal 102 (e.g., based on where the access terminal 102 registers) and/or receive mobility information from the access terminal 102. If the access terminal 102 is a high mobility node, its may be desirable to page the access terminal 102 via an overlay network. Consequently, in such a case, the list generator 110 may add one or more zone identifiers (e.g., corresponding to the zones that provide coverage in the vicinity of the access terminal 102) to the list 112. Conversely, if the access terminal 102 is a low mobility node, its may be desirable to page the access terminal 102 via an underlay network. In such a case, the list generator 110 may add one or more node identifiers (e.g., corresponding to the femto nodes or pico nodes in the vicinity of the access terminal 102) to the list 112. From the above, it should be appreciated that a size of a paging area for the access terminal 102 may be based on the mobility of the access terminal 102.

In some aspects the list 112 may be generated based on how frequently the access terminal 102 is paged. For example, the list generator 110 may cooperate with the paging controller 118 to determine how frequently the access terminal 102 is being paged. A determination may then be made to page the access terminal 102 in a given area when it is being paged infrequently, and page the access terminal 102 in a smaller area when it is being paged more frequently to reduce the registration load in the network. The list generator 110 may therefore add identifiers (e.g., zones, node identifiers, etc.) associated with these different paging areas to the list 112, as appropriate. Thus, a size of a paging area for the access terminal 102 may be inversely related to how frequently the access terminal 102 is paged.

Similarly, in some aspects the list 112 may be generated based on one or more applications associated with the access terminal 102. For example, the list generator 110 may maintain information (e.g., based on information received from the access terminal 102 or another node) that indicates which applications are associated with (e.g., currently active on) the access terminal 102. Here, it may be determined that some applications will result in a node being paged more frequently than other applications. In addition, it may be determined that some nodes are better suited for (e.g., more efficient in) paging some types of applications. Thus, the list generator 110 may add identifiers (e.g., zones, node identifiers, etc.) associated with larger and smaller paging areas or different nodes to the list 112, as appropriate.

In some aspects the list 112 may be generated based on the time of day. For example, the list generator 110 may maintain information (e.g., based on signals received from the access terminal 102 or registration information) that indicates where (e.g., which zone, etc.) the access terminal typically is at certain times of day. The list generator 110 may therefore add identifiers (e.g., zones, node identifiers, etc.) associated with these locations, etc., to the list 112.

In some aspects the list 112 may be generated based on an association of the access terminal 102 with one or more other nodes (e.g., a home node). For example, the list generator 110 may maintain information (e.g., based on information received from the access terminal 102 or another network node) that indicates where the access terminal 102 should be paged when the access terminal 102 is associated with a particular node. The list generator 110 may then add corresponding identifiers (e.g., zones, node identifiers, etc.) to the list 112, as appropriate, based on this information.

In some aspects the list 112 may be generated based on a frequency band over which the access terminal 102 is paged. For example, the list generator 110 may add identifiers (e.g., zones, node identifiers, etc.) for nodes that page on the designed frequency bands to the list 112, as appropriate.

As represented by block 308 of FIG. 3, the network node 108 (e.g., the list generator 110) sends the list 112 to the access terminal 102. For example, the access point 104 may forward a message including the contents of the list 112 to the registration controller 122 as represented by line 142 in FIG. 1.

As represented by block 310, at some point in time the network node 108 (e.g., the paging controller 118) will determine that the access terminal 102 needs to be paged. For example, a call may have been placed to the access terminal 102 or data destined for the access terminal 102 may have been received.

Figure 3B:
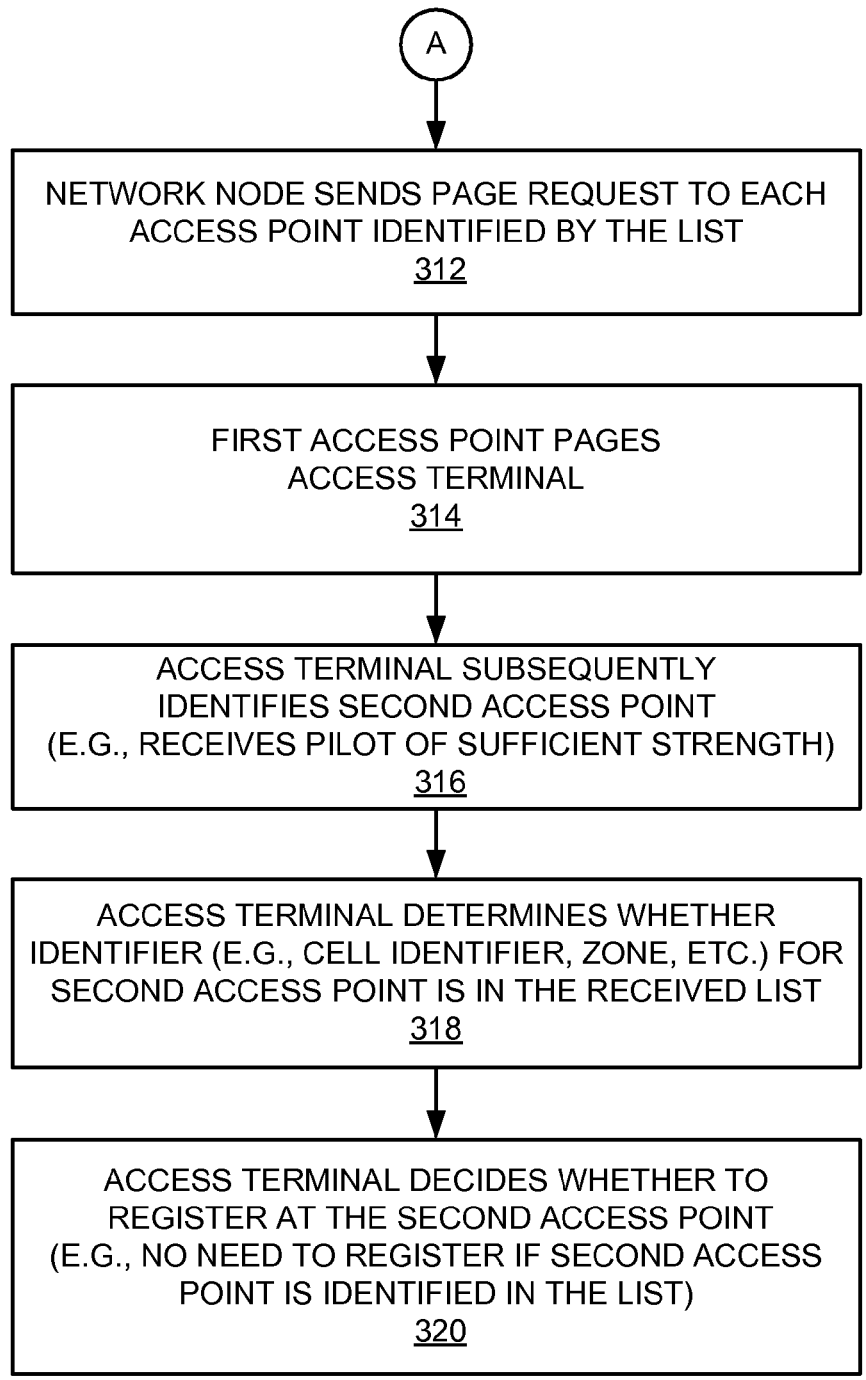

As represented by block 312 of FIG. 3B, the network node 108 sends a page request to each access point identified by the list 112. For example, if the list 112 includes a zone identifier, the paging controller 118 may send a page request to each access point associated with the zone. Similarly, if the list includes an individual node identifier, the paging controller 118 may send a page request to that node. If the list includes a subscriber group identifier, the paging controller 118 may send a page request to each access point associated with that subscriber group.

As represented by block 314, each access point that receives a page request pages the access terminal 102 at an appropriate time. For example, upon receiving a page request, a paging controller 124 of the access point 106 may cause a transceiver 126 (e.g., comprising a receiver 128 and a transmitter 130) to send a page.

The access terminal 102 receives the page via its own transceiver 132 (e.g., comprising a receiver 134 and a transmitter 136). The access terminal 102 may then commence page-related processing. For example, the access terminal 102 (e.g., a communication processor 138) may cause a page response to be sent to the network node 108.

As represented by block 316, at some point in time the access terminal 102 (e.g., a node identifier 140) may identify a second access point. For example, as the access terminal 102 moves within a network, the access terminal 102 (e.g., the receiver 134) may receive a pilot signal from another access point. That is, as the access terminal 102 approaches the access point, the signal strength of the received pilot signal may eventually exceed a threshold that is deemed sufficient to establish reliable communication with the access point. The access terminal 102 may then elect to idle on the second access point.

The access terminal also may receive information broadcast by the second access point via the pilot or some other signal. For example, in FIG. 1 the access point 106 (e.g., the transmitter 130) may broadcast node information such as an identifier associated with the access point 106 (e.g., a zone identifier, a node identifier, a cell identifier, a subscriber group identifier, etc.). In addition, as discussed in more detail below in conjunction with FIGS. 5 and 6, the access point 106 may broadcast one or more indications relating to how an access terminal should register to receive pages from the access point 106 and whether the access point 106 may page the access terminal.

As represented by block 318, the access terminal 102 determines whether any identifiers associated with the second access point are in the list received from the network node 108 (e.g., corresponding to list 112). For example, the registration controller 122 may compare the identifiers in the list received from the network node 108 with an identifier of the first type received from the access point 106 and/or an identifier of the second type received from the access point 106 at block 316.

As represented by block 320, the access terminal 102 then determines whether to register at the second access point based on the determination of block 318. For example, if the access point 106 is identified by the list received from the network node 108, the registration controller 122 may elect to not register at the access point 106 since the network node 108 will cause the access point 106 to page the access terminal 102 when necessary.

As mentioned above, the list provided by the network for paging a given access terminal may be based on a list (e.g., a suggested paging set) provided by that access terminal. FIG. 4 illustrates sample operations that may be performed by a network node and an access terminal that generate such lists.

As represented by block 402, the access terminal 102 provides a list of identifiers in conjunction with registration of the access terminal 102. Here, the list generator 114 may identify a set of nodes (e.g., zones, cells, sectors, etc.) that the access terminal 102 wished to be paged by and then add associated identifiers to the list 116. As discussed above, the list 116 may comprise a forward-looking list that identifies nodes that the access terminal 102 is likely to idle on in the relatively near future. The access terminal 102 may include the contents of the list in a registration message (e.g., a registration request) sent by the registration controller 122 as represented by line 144 in FIG. 1, or the access terminal 102 may send the list to the network node 108 in some other manner.

The list 116 may include different types of identifiers. For example, as in the list 112, the list 116 may include a first type of identifier that comprises an identifier of an individual node or an identifier of a subscriber group. In addition, the list 116 may include a second type of identifier that relates to a zone, a subscriber group, a location of an access terminal, and so on. Other types of identifiers may be employed in various implementations.

The list generator 114 may generate the list 116 in various ways and based on various criteria. Several examples of how the list 116 may be generated follow. It should be appreciated that the list 116 may be generated based on one or more of these techniques and other techniques.

As described in more detail below in conjunction with FIG. 7, in some aspects the list 116 may be generated based on whether the access terminal 108 is close to a specified node. For example, the list generator 114 may add an identifier of the home femto node of the access terminal 102 to the list in the event the access terminal 102 (e.g., the receiver 134) receives radio frequency ("RF") signals from the home femto node or if the access terminal determines that it is near (e.g., has entered the coverage area of) another node (e.g., a home macro node) that is in the vicinity of the home femto node. Here, an identifier of the home femto node may comprise, for example, a node identifier (e.g., a cell identifier) or a subscriber group identifier.

In some aspects the list 116 may include identifiers of neighboring nodes of the access terminal 102 or a nearby node (e.g., access point 106). For example, the access terminal 102 (e.g., the receiver 134) may receive information that identifies at least one neighbor node. This information may be received in various ways. For example, in some cases the access terminal 102 may receive a neighbor list from the network node 108 (e.g., a mobility manager that currently manages paging for the access terminal 102). In some cases the access terminal 102 (e.g., the receiver 134) may detect radio frequency signals from neighboring nodes, then identify the nodes that sent the signals and add identifiers associated with those nodes to the list 116. In some cases the access terminal 102 may receive a neighbor list from the nearby node (e.g., access point 106).

The list 116 also may be defined in a similar manner as the list 112. Briefly, the list 116 may be generated based on one or more applications associated with the access terminal 102. The list 116 may be generated based on the time of day. The list 116 may be generated based on an association of the access terminal 102 with one or more other nodes. The list 116 may be generated directly based on a frequency band over which the access terminal 102 is paged. Implementation details of these examples may be similar in some aspects to comparable details discussed above at FIG. 3.

Also as above, in some aspects the list 116 may be generated based on where the access terminal 102 last registered or previously established a connection. As discussed above, the list generator 114 may maintain a database from which the list generator 114 may determine neighbors (e.g., neighboring nodes or zones) of a given node, zone, tracking area, subscriber set, and so on. Alternatively, the access terminal 102 may communicate with the corresponding nodes to obtain neighbor lists from these nodes. Again, if the access terminal 102 is registered at a macro node, the list generator 114 may exclude from the list 116 any nodes from an underlay network, while if the access terminal 102 is registered at a femto node or pico node, the list generator 114 may exclude from the list 116 any macro nodes that are not neighbors of the femto node or pico node. In some cases, when the access terminal 102 is idling on a femto node, the access terminal 102 may automatically add a macro neighbor of the femto node to the list 116 since the access terminal 102 may likely move out of the coverage of the femto node and into the coverage of the macro.

In some aspects the list 116 may be generated based on a location of the access terminal 102. For example, the list generator 110 may determine identifiers of zones or nodes in the vicinity of that location and add these identifiers to the list 116. Again, the location of the access terminal 102 may be estimated based on where the access terminal 102 last registered or based on a last known paging zone of the access terminal 102.

In some aspects the entries in the list 116 may be based on the mobility of the access terminal 102. As discussed above, a high mobility access terminal may be paged via an overlay network, while a low mobility access terminal may be paged via an underlay network. Thus, the size of a paging area for the access terminal 102 may be based on the mobility of the access terminal 102.

In some aspects the list 116 may be generated based on how frequently the access terminal 102 is paged. For example, the access terminal 102 may be paged over a larger area (e.g., by selecting the overlay network for the list 116) when it is being paged infrequently, and paged over a smaller area (e.g., by selecting a portion of an underlay network for the list 116) when it is being paged more frequently to reduce the registration load in the network.

In some aspects the list 116 is restricted to only include nodes from a single zone. For example, when the access terminal 102 adds a node identifier to the list, the access terminal 102 may be able to determine which zone the node is associated with (e.g., based on information included in a neighbor report or information provided by the node). In this case, the list generator 114 may elect to not add an identifier to the list 116 if that identifier is associated with a different zone than the other identifiers in the list 116. In some cases, however, the access terminal 102 may not know which zone a node is associated with. In such cases, the list generator 114 may initially add the corresponding identifier to the list 116. In the event the access terminal 102 later tries to access this node and discovers that the node is in a different zone, the list generator 114 may then rebuild the list by identifying nodes in the new zone and putting identifiers of those nodes in the list 116.

As represented by block 404 of FIG. 4, the network node 108 receives the list sent by the access terminal 102. For example, the information from the list 116 may be received in conjunction with a registration request (e.g., in the same or a different message) received via the access point 104.

As represented by block 406, the network node 108 (e.g., the list generator 110) commences determining a paging set for paging the access terminal 102. In some cases, the network node 108 may generate a paging set according to the network's standard paging rules (e.g., tracking area-based rules, zone-based rules, distance-based rules). In addition, or alternatively, the paging set may be generated using the techniques described above in conjunction with defining the list 112. In some cases, the paging set may be defined (e.g., obtained) from the list received at block 404. In some aspects, the paging set may include one or more types of identifiers as taught herein.

As represented by block 408, the network node 108 (e.g., the list generator 110) may take into account the list received from the access terminal 108 when identifying a final set of nodes for paging the access terminal 108. The degree to which the final set of nodes is based on the received list may be different under different circumstances.

In some cases the final set on nodes includes all of the nodes identified by the received list. In these cases, the final set of nodes may or may not include nodes that were not on the received list. For example, in some cases the final set of nodes may simply equate to the received list. In some cases the final set of nodes may include additional nodes. For example, the network node 108 may substitute a corresponding zone for a node identified by the received list. The network node 108 also may add nodes from a paging set derived at block 406 to the nodes identified by the received list.

In some cases the final set of nodes may not include all of the nodes identified by the received list. That is, the network node 108 may elect to not page at one or more nodes, zones, etc., identified by the received list. For example, the network node 108 may remove entries that cannot be paged or that are associated with different zones. In addition, the network node 108 may limit the number of entries in the final set of nodes. In some cases, the deletion of any entries in the received list by the network node 108 may override the entries in any lists maintained by the access terminal 102.

As represented by block 410, the network node 108 sends a new list that is defined based on the final set of nodes to the access terminal 102. The operations of block 410 may thus correspond to the operations of block 308. As above, the new list may include different types of identifiers associated with the final set of nodes. Thus, in view of the above, the new list received by the access terminal 102 may identify one or more of the nodes identified in the list the access terminal 102 sent to the network node at block 402. The access terminal 102 may then use the new list to determine whether it needs to register at a given access point (e.g., as described above at blocks 316-320).

As represented by block 412, as necessary, the network node 108 sends a page request to each node in the final set of nodes (i.e., corresponding to the identifiers in the new list) so that these nodes will page the access terminal 102. These operations therefore correlate to the operations of blocks 310-314 described above. Thus, if the new list includes a zone identifier, the paging controller 118 may send a page request to each access point associated with the zone. If the new list includes an individual node identifier, the paging controller 118 may send a page request to that node. If the new list includes a subscriber group identifier, the paging controller 118 may send a page request to each access point associated with that subscriber group.

Referring now to FIGS. 5 and 6, in some implementations a node (e.g., an access point) may advertise an indication relating to how that node performs paging and/or whether/how another node (e.g., an access terminal) may register at that node. In some aspects, such operations may relate to a scenario where an access point advertises an indication that a specific type of identifier should be used for registration. In some aspects, such operations may relate to a scenario where an access point advertises an indication that implies that the access point will not page another node unless that node requests to be paged by that access point. In some aspects, such operations may relate to a scenario where an access point advertises an indication that implies that the access point will not induce other nodes to page a node. Through the use of such schemes, the network (e.g., an MME) may in some aspects be relieved of having to distinguish between nodes of an overlay network and nodes of an underlay network (e.g., the network need not keep track of which access terminal are allowed to access a restricted femto node). In addition, in some aspects such schemes may relieve an overlay node of the burden of keeping track of which underlay nodes are deployed within the coverage area of the overlay node. FIG. 5 describes sample operations that may be performed by an access point such as the access point 106 of FIG. 1. FIG. 6 describes sample operations that may be performed by an access terminal such as the access terminal 102 of FIG. 1.

As represented by block 502, the access point 106 (e.g., an identifier determiner 146) determines different types of identifiers that may be used in conjunction with registering at the access point 106. For example, this information may be obtained from another node and/or maintained in a data memory (not shown) at the access point 106. Here, a first type of identifier may comprise an individual node identifier assigned to the access point 106 or a subscriber group to which the access point 106 belongs. In addition, a second type of identifier may relate to a zone or a subscriber group with which the access point 106 is associated, a location of the access point 106 or an access terminal, and so on. Other types of identifiers may be employed in various implementations.

As represented by block 504, the access point 106 (e.g., identifier determiner 146) determines whether to use one of the identifier types for registration. For example, the access point 106 may only allow registration through the use of a first type of identifier. In this case, zone-based registration, distance-based registration, and other registration schemes that rely on the second type of identifier may be disabled at the node. Hence, an access terminal wishing to be paged by the access point 106 may be required to either register directly at the access point 106 or include an identifier of the first type that identifies the access point 106 in a suggested paging set.

The determination of block 504 may be based on various criteria. For example, in some aspects the determination may be based on configuration information the access point 106 received from the network node 108 (e.g., a configuration manager such as an MME). Such configuration information may specify, for example, which type of identifier should be specified for use by the access point 106. In some aspects the determination may be based on a node type of the access point 106. For example, nodes for an underlay network or restricted nodes (e.g., femto nodes and pico nodes) may be configured to only permit use of the first type of identifier, while nodes for an underlay network (e.g., macro nodes) may be configured to allow use of any type of identifier. In some aspects the determination may involve determining whether the access point 106 is part of a paging set of nodes (e.g., whether the access point is associated with a paging zone). Here, if the access point 106 is not part of such a set, the access point 106 may be configured to only permit use the first type of identifier. Conversely, if the access point 106 is part of such a set, the access point 106 may be configured to allow use of any type of identifier.

As represented by block 506, the access point 106 (e.g., the transmitter 130) may advertise an indication (e.g., an SPS bit in a message) that is indicative of the determination of block 504. For example, the indication may imply that the first type of identifier and not the second type of identifier is to be used for registration. Also, in some aspects the indication may imply that the access point 106 will not page another node unless that node requests to be paged by the access point 106 (e.g., by registering at that access point or by including that access point in a suggested paging set). In addition, in some aspects the indication may imply that the access point 106 will not induce other nodes (e.g., neighboring access points) to page a node. In other words, the access point 106 will not fan-out page requests (i.e., in a network where access points are allowed fan-out page requests to other access points). In some aspects, the indication may imply that certain types of registration schemes are disabled at the access point 106. For example, when the second type of identifier relates to distance-based registration whereby a decision to register is based on the current location of an access terminal, the indication may indicate that such distance-based registration is disabled. Also, in some cases the indication may be set to a value defined for a given identifier (e.g., the indication may be set to the GCI of the access point 106).

As represented by block 508, in some cases the access point 106 (e.g., the transmitter 130) may advertise a list that identifies the neighbor nodes (e.g., macro nodes, femto nodes, pico nodes) of the access point 106. As mentioned above, this information may be used by the access terminal 102 or the network node 108 to generate a list for paging the access terminal 102.

Referring now to FIG. 6, as represented by block 602, at some point in time an access terminal may receive an indication relating to registration as discussed above in conjunction with FIG. 5. For example, when the access terminal 102 is close enough to the access point 106, the access terminal 102 may receive a broadcast signal (e.g., a pilot) that includes the indication.

As represented by block 604, in the event the access terminal 102 wishes to be paged by the access point 106, the access terminal 102 (e.g., the list generator 114) may define a suggested paging set (e.g. list 116) as taught herein. In this case, the suggested paging set may be defined to include an identifier of the access point 106, where the identifier is of the specified type.

As represented by block 606, the access terminal 102 may then provide the suggest paging set to the network node 108. In some cases, the suggested paging set may be provided to the network node 108 in conjunction with registration of the access terminal 102 (e.g., at another access point) as discussed herein. Once, the network node 108 receives the suggested paging set, the network node 108 may cause the access point 106 to page the access terminal 102, whenever paging is indicated.

In addition, as represented by block 608, the access terminal 102 may receive a list of identifiers from the network node 108. This list may thus include the identifier of the access point 106 from the suggested paging set. Consequently, if the access terminal 102 revisits the access point 106 in the near future, the access terminal 102 may not need to register again since the access point 106 was indicated in the last SPS sent to the network node 108. The use of a forward-looking SPS thus allows the access terminal 102 to reduce its registration load.

As mentioned above, an SPS may be used in conjunction with other types of registration triggers (e.g., zone-based, distance-based). For example, in the absence of a received indication as discussed above (hereafter referred to as an SPS bit, for convenience), an access terminal may follow standard distance-based or zone-based registration triggers. However, an access terminal may not register based on a distance or zone trigger if the new access point is already in the SPS. In addition, an access terminal may register based on an SPS bit trigger if the new access point is not in the SPS, even if a distance or zone trigger is not indicated. Also, in some aspects registering in response to an SPS bit may set an access terminal's distance parameter to zero. Thus, registration may be triggered as soon as the access terminal leaves this access point, unless overridden by the SPS. In some cases, other types of triggers (e.g., SID-based, NID-based, inactivity-based) may not be overridden by an SPS bit trigger.

In some cases, an access terminal may elect to reregister if it determines that the paging reliability associated with the last SPS sent to the network is less than (e.g., by a threshold amount) the paging reliability associated with a desired SPS generated by the access terminal. In some cases, another prerequisite to such a re-registration may be that the paging reliability associated with the last SPS is below a threshold value.

FIG. 7 illustrates several operations that an access terminal may perform to define an SPS (e.g., list 116). As represented by block 702, at some point in time, an access terminal will identify a node to be added to its SPS. For example, the access terminal may maintain its SPS by adding the strongest access point (e.g., a sector of the access point) it hears to the SPS and/or by adding the access point on which the access terminal is currently idling to the SPS.

As represented by blocks 704 and 706, the access terminal also may add the neighbors of that access point to the SPS. For example, if the access point is advertising an indication as described above at FIG. 5 (e.g., an SPS bit) at block 704, the access terminal may add the neighbors of that access point to the SPS (e.g., since the access point may not support fan-out).

In some implementations, an access terminal may be able to infer the need for an SPS based on one or more of the parameter settings of distance, zone, sector identifier ("SID"), and network identifier ("NID"). In such implementations, the access point may not transmit an SPS indication over the air.

Also, if the SPS is not needed (e.g., when the access terminal is idling on a macro node), there may be no need to add the neighbors of the macro node to the SPS since those neighbors may automatically page the access terminal based on standard paging rules (e.g., tracking area-based, zone-based, distance-based).

As represented by block 708, in some cases an access terminal may optimize its SPS for the home femto node of the access terminal. For example, if at block 710, the access terminal is currently registered at the home macro cell (e.g., the macro cell which is the strongest neighbor of its home femto node), then the access terminal may automatically add the home femto node to its SPS at block 712. Also, if the access terminal can hear its home femto node at block 714, the access terminal may automatically add the home femto node to the SPS at block 712.

Various provisions may be employed to manage the number of entries in the SPS. For example, in the event the signal of an access point listed in the SPS remains too weak for a period of time (e.g., the carrier-to-interference ratio associated with the access point is below a threshold level) the access point (and optionally any neighbors added with this access point) may be dropped from the SPS. Here, a timer may commence counting when the access point signal falls below the designated threshold and continue counting as long as this condition holds. The access point may then be dropped from the SPS if a defined count is reached. In some cases, an access point that may otherwise be dropped from the SPS may instead be retained in the SPS. For example, a designated access point may remain in the SPS if it is a neighbor of some other access point (e.g., whereby it is likely that the access terminal will likely visit the designated access point in the near future). Furthermore, if the SPS reaches its size limit, one or more access points may be dropped based on some criterion or threshold (e.g., the access points with the longest running timers may be dropped). In some cases an access point may be dropped from the SPS when the access terminal registers at a new access point that does not advertise an SPS bit (or some other similar indication). In some cases an access point may be dropped from the SPS based on the access terminal determining that it would be paged by the access point due to standard paging rules (e.g., tracking area, zone, distance).

The SPS also may be stored at a mobility manager (e.g., network node 108) such as a mobility manager entity ("MME") or a session reference network controller ("SRNC"). The access terminal may communicate the SPS to the mobility manager when the strongest access point detected by the access terminal was not in the last SPS sent to the mobility manager, and the access terminal needs to use the SPS (e.g. the SPS bit is indicated for the sector). The mobility manager may then use the newly received SPS to overwrite the current SPS stored at the mobility manager.

In some aspects, the transfer of the SPS from the access terminal to the mobility manager may be optimized. For example, the access terminal may only send the delta (e.g., the addition or deletion of a cell) between the last SPS and the current one. Also, the access terminal may list a cell (or sector, or access point) and a zone/distance, rather than list each cell explicitly. In addition, the SPS may specify a given node plus its neighbors, rather than list all neighbors explicitly.

Figure 8:
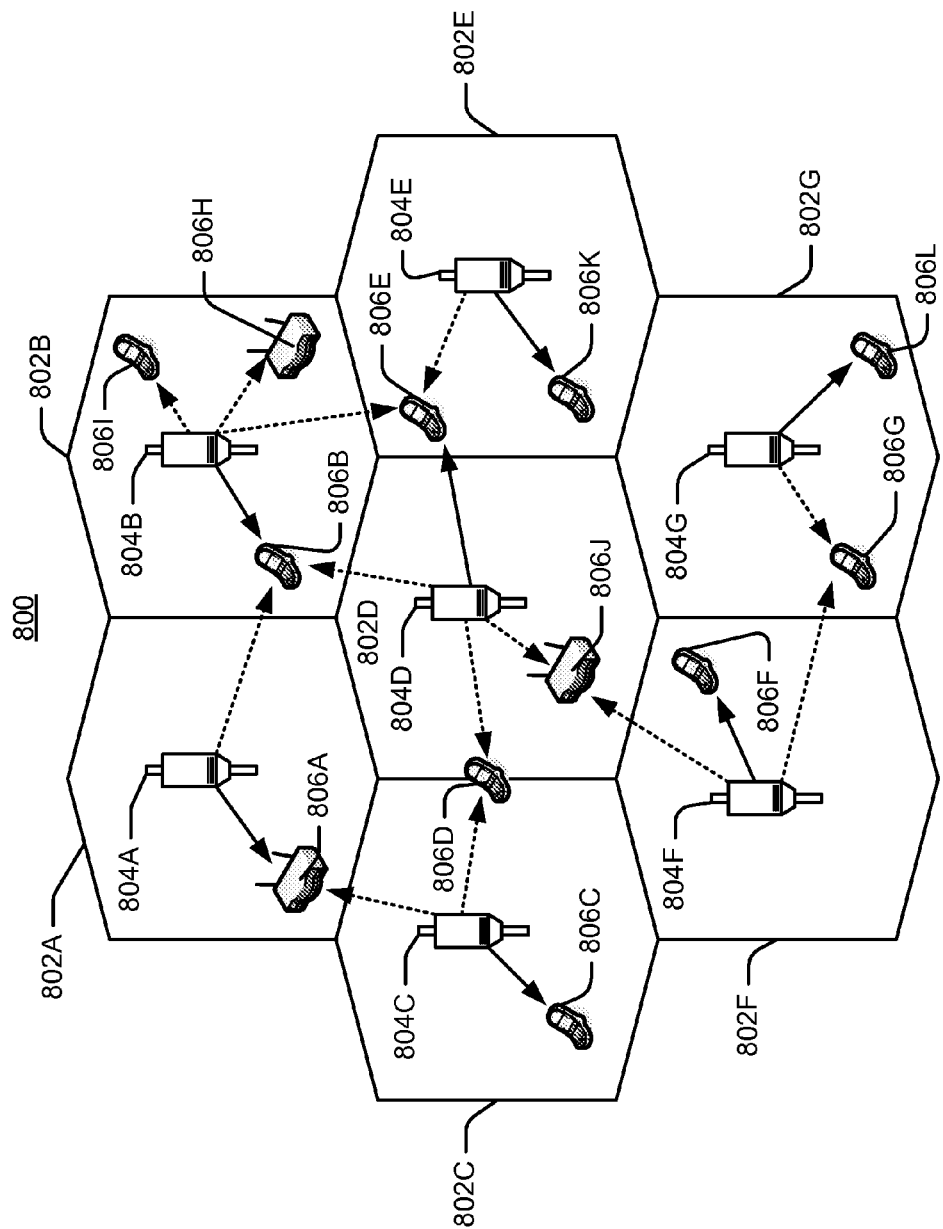
FIG. 8 is a simplified diagram of a wireless communication system.
Figure 9:
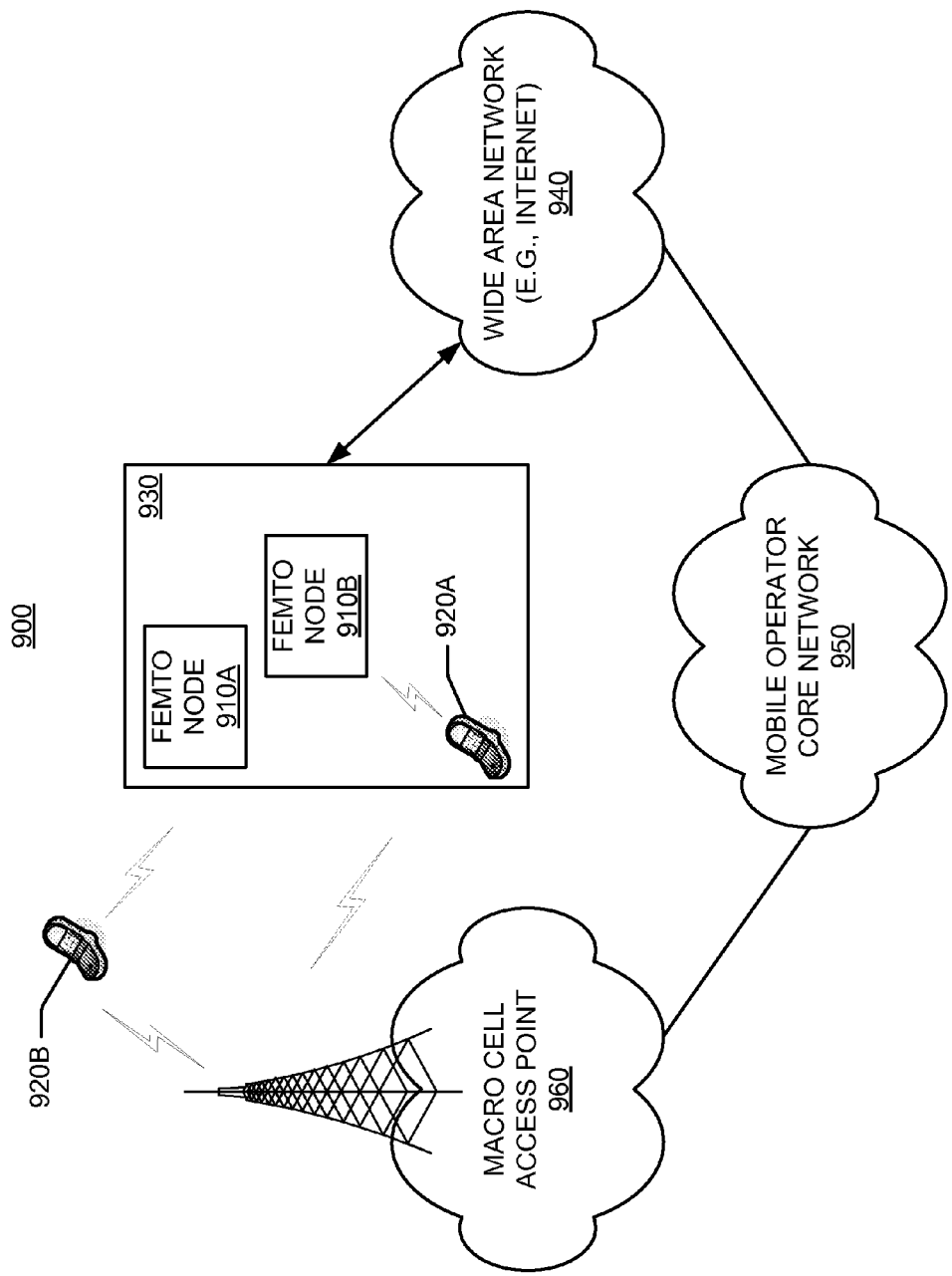
FIG. 9 is a simplified diagram of a wireless communication system including femto nodes.

As mentioned above, paging and registration schemes as taught herein may be employed in a network that includes macro and femto coverage. FIGS. 8 and 9 illustrate examples of such a deployment.

FIG. 8 illustrates several aspects of a wireless communication system 800 comprising multiple cells 802, such as, for example, macro cells 802A-802G, with each cell being serviced by a corresponding access point 804 (e.g., access points 804A-804G). Thus, the macro cells 802 may correspond to the macro coverage areas 204 of FIG. 2. As shown in FIG. 8, access terminals 806 (e.g., access terminals 806A-806L) may be dispersed at various locations throughout the system over time. Each access terminal 806 may communicate with one or more access points 804 on a forward link ("FL") and/or a reverse link ("RL") at a given moment, depending upon whether the access terminal 806 is active and whether it is in soft handoff, for example. The wireless communication system 800 may provide service over a large geographic region. For example, macro cells 802A-802G may cover a few blocks in a neighborhood or several square miles in rural environment.

FIG. 9 is an example of a system 900 that illustrates how one or more femto nodes may be deployed within a network environment (e.g., the system 800). The system 900 includes multiple femto nodes 910 (e.g., femto nodes 910A and 910B) installed in a relatively small area coverage network environment (e.g., in one or more user residences 930). Each femto node 910 may be coupled to a wide area network 940 (e.g., the Internet) and a mobile operator core network 950 via a DSL router, a cable modem, a wireless link, or other connectivity means (not shown).

The owner of a femto node 910 may subscribe to mobile service, such as, for example, 3G mobile service, offered through the mobile operator core network 950. In addition, an access terminal 920 may be capable of operating both in macro environments and in smaller area coverage (e.g., residential) network environments. In other words, depending on the current location of the access terminal 920, the access terminal 920 may be served by a macro cell access point 960 associated with the mobile operator core network 950 or by any one of a set of femto nodes 910 (e.g., the femto nodes 910A and 910B that reside within a corresponding user residence 930). For example, when a subscriber is outside his home, he may be served by a standard macro access point (e.g., access point 960) and when the subscriber is near or inside his home, he may be served by a femto node (e.g., node 910A). Here, a femto node 910 may be backward compatible with legacy access terminals 920.

As mentioned above, a node (e.g., a femto node) may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 910 that reside within the corresponding user residence 930). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access points (e.g., femto nodes) that share a common access control list of access terminals. A channel on which all femto nodes (or all restricted femto nodes) in a region operate may be referred to as a femto channel.

Various relationships may thus exist between a given femto node and a given access terminal. For example, from the perspective of an access terminal, an open femto node may refer to a femto node with no restricted association (e.g., the femto node allows access to any access terminal). A restricted femto node may refer to a femto node that is restricted in some manner (e.g., restricted for association and/or registration). A home femto node may refer to a femto node on which the access terminal is authorized to access and operate on (e.g., permanent access is provided for a defined set of one or more access terminals). A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that is authorized to access the restricted femto node (e.g., the access terminal has permanent access to the femto node). A guest access terminal may refer to an access terminal with temporary access to the restricted femto node (e.g., limited based on deadline, time of use, bytes, connection count, or some other criterion or criteria). An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. Each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 10:
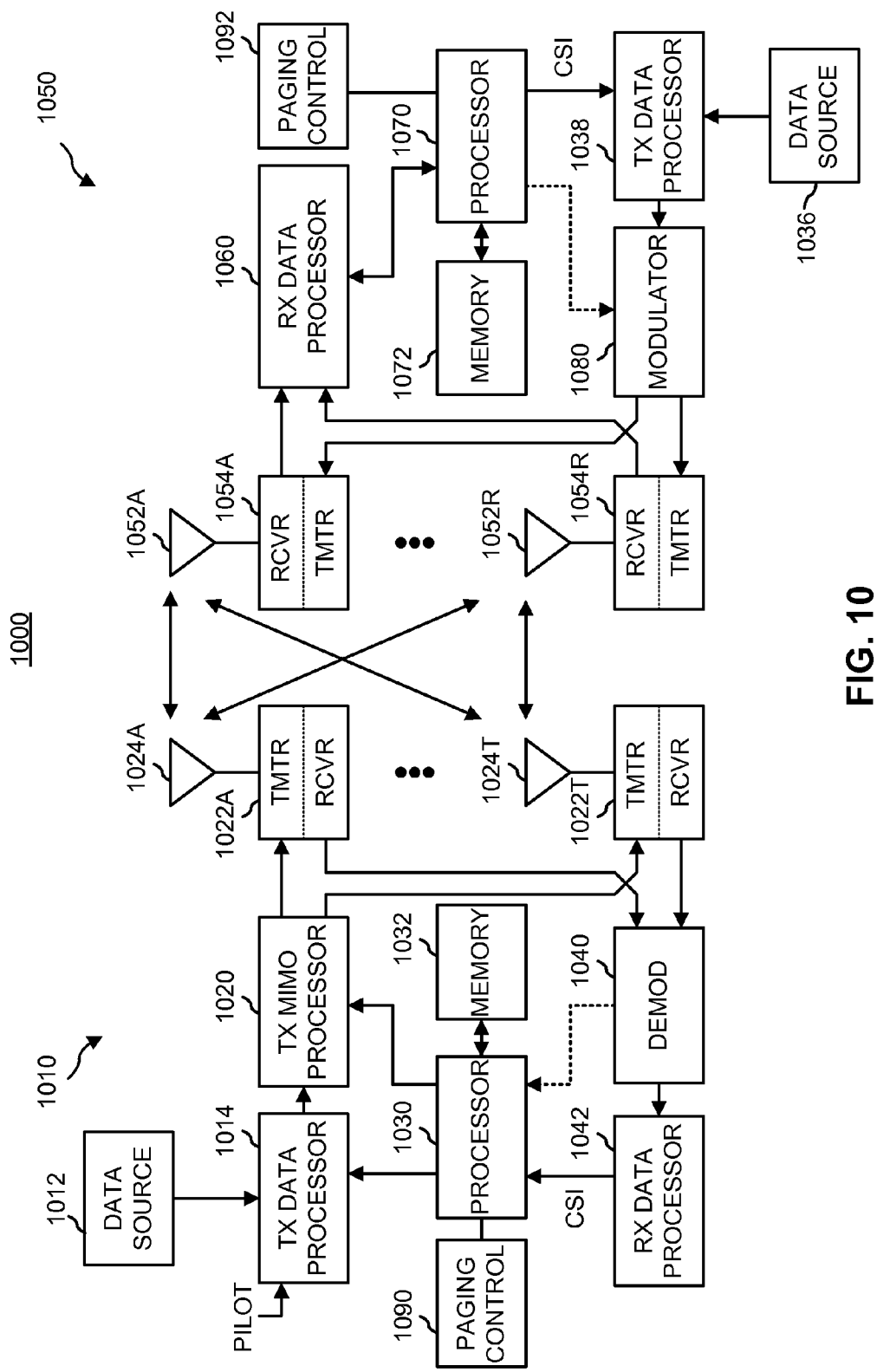
FIG. 10 is a simplified block diagram of several sample aspects of communication components.
Figure 11:
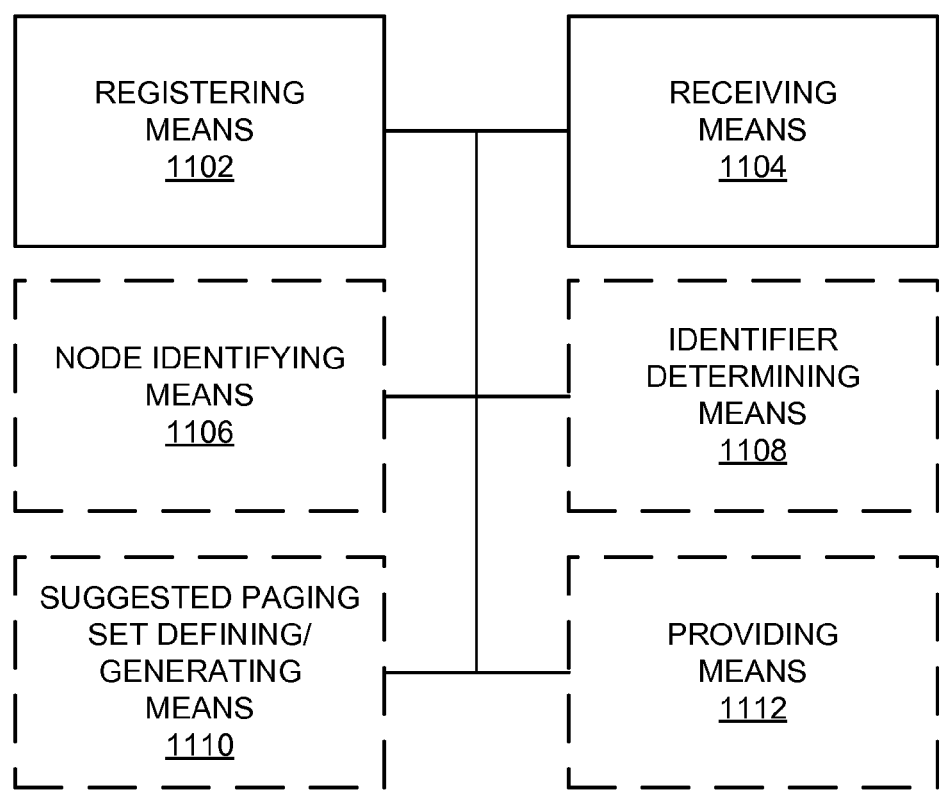
FIGS. 11-16 are simplified block diagrams of several sample aspects of apparatuses configured to use multiple types of identifiers for wireless communication paging and/or registration as taught herein.
Figure 12:
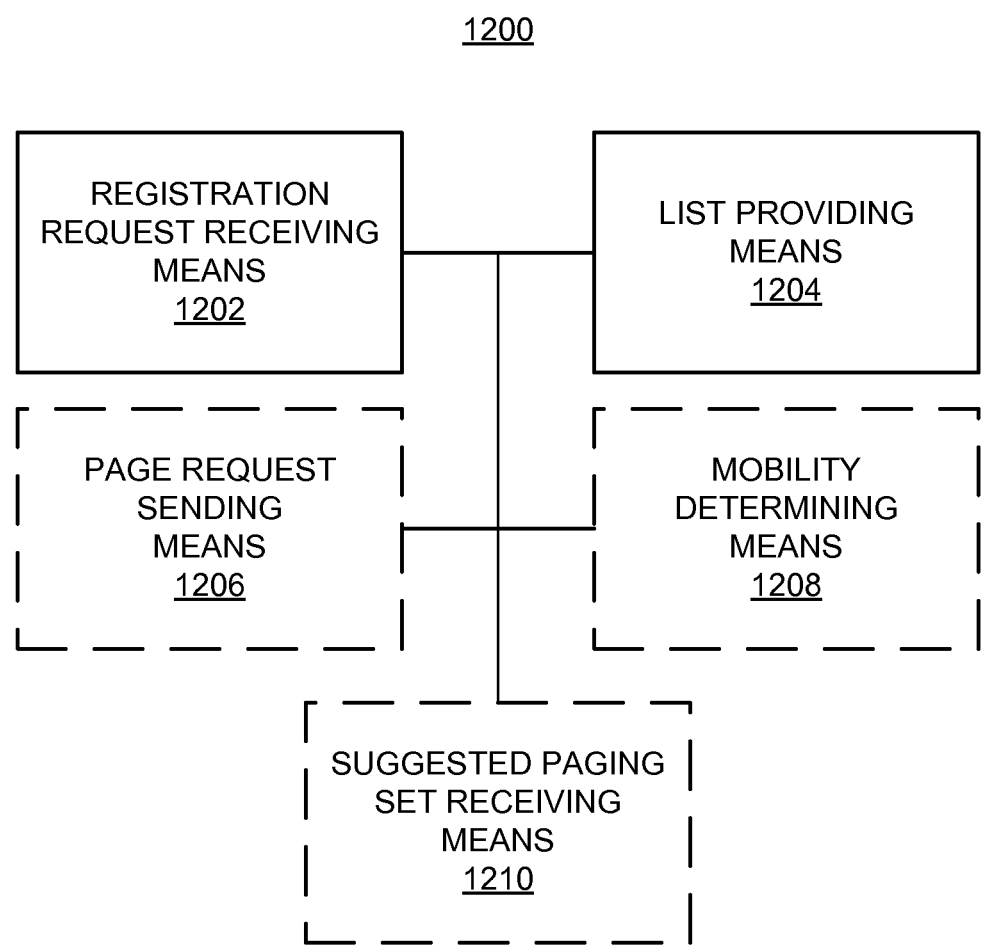
Figure 13:
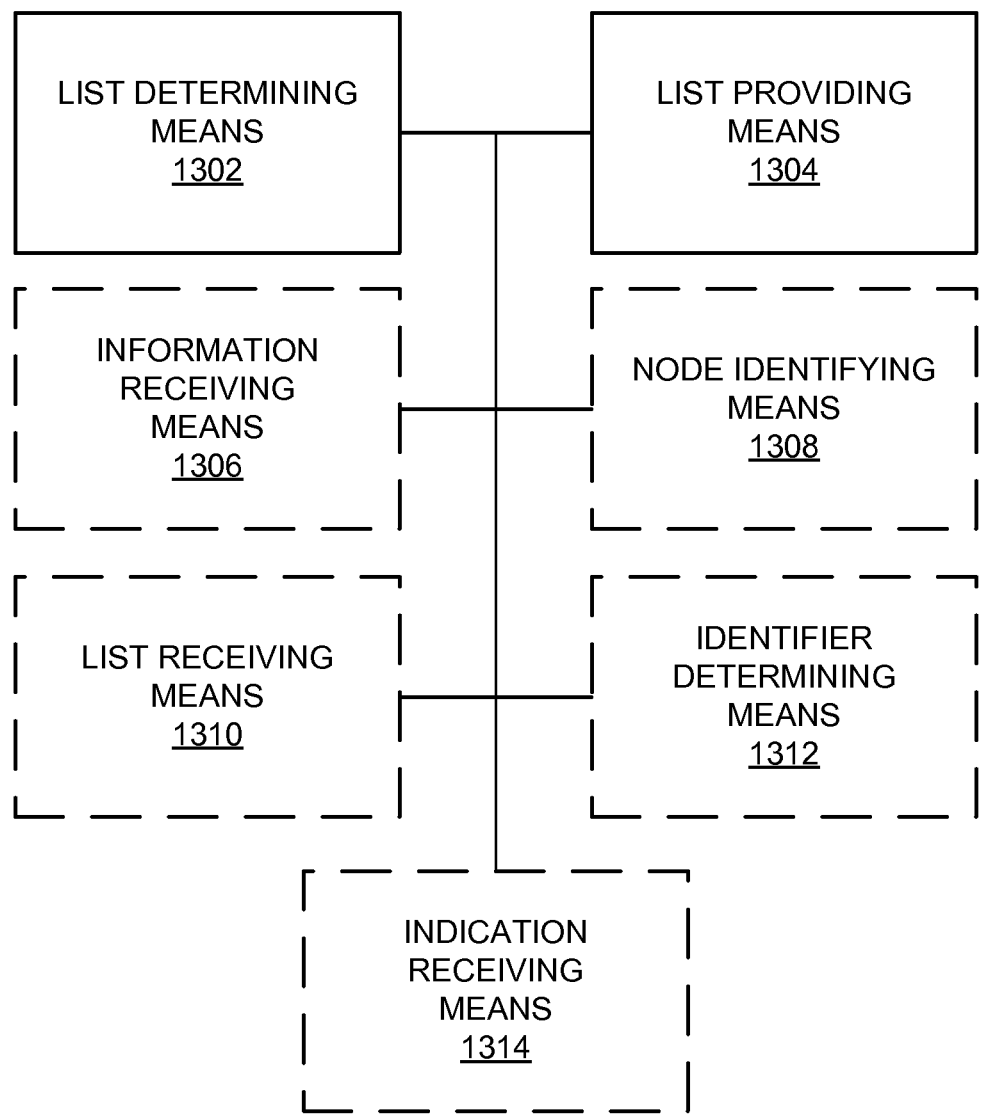
Figure 14:
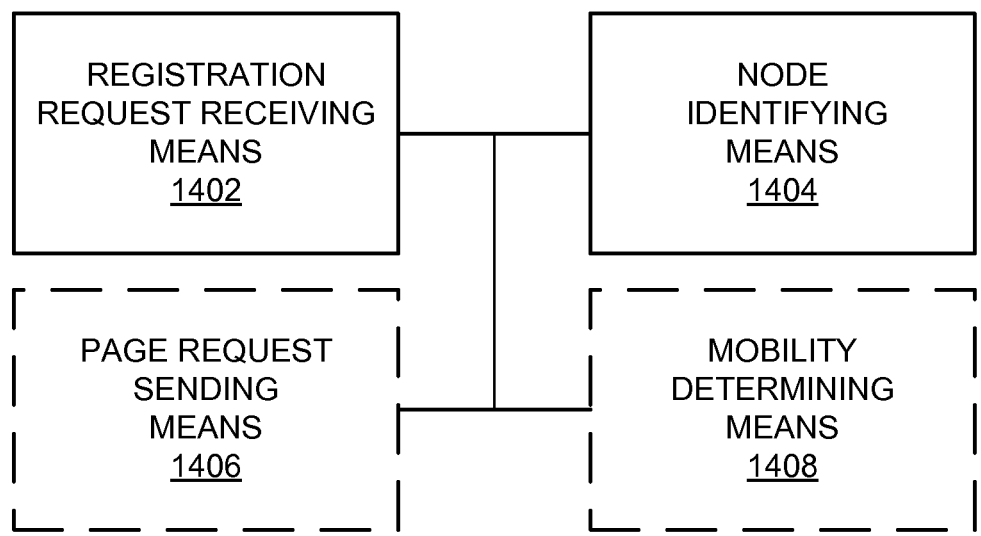
Figure 15:
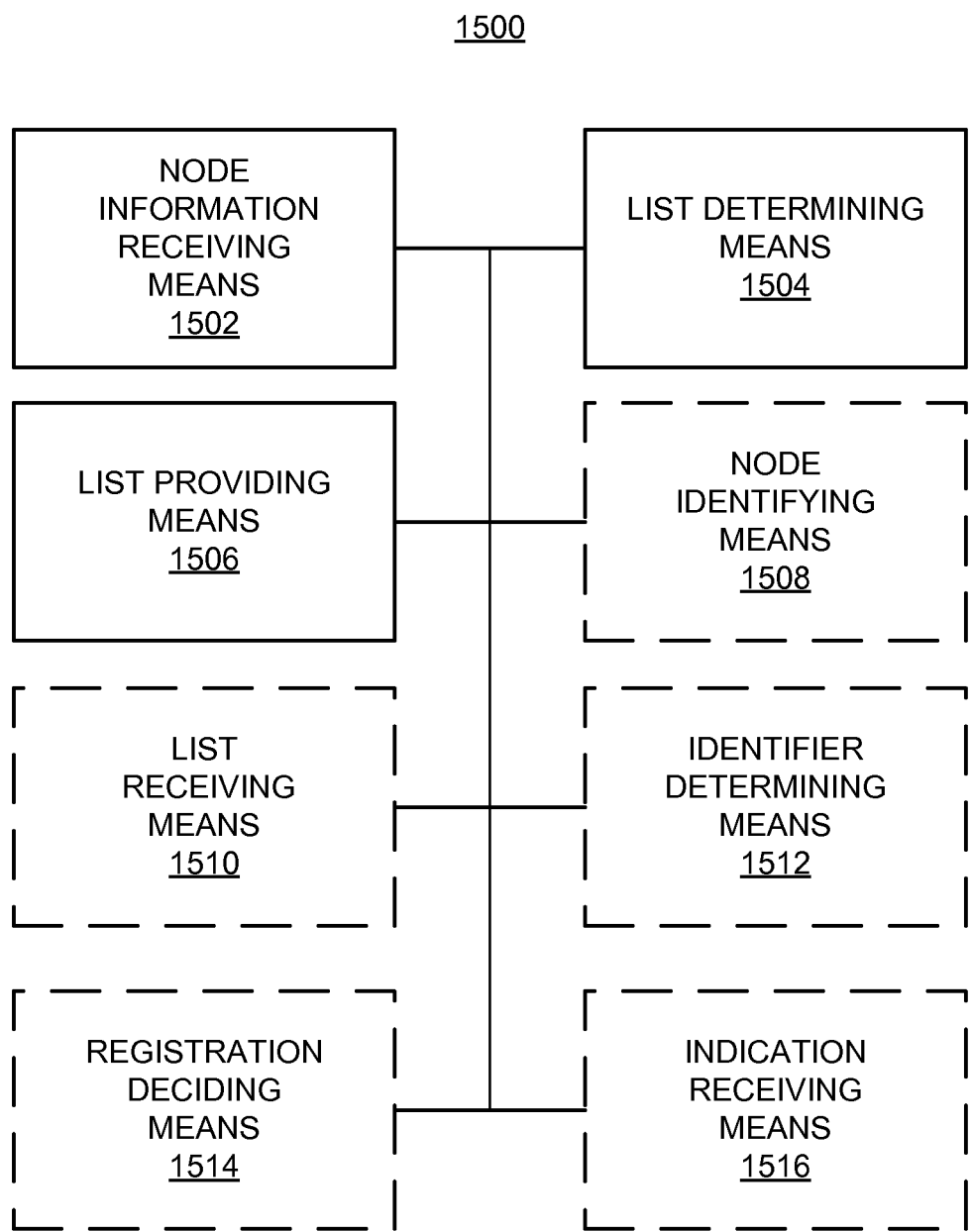
Figure 16:
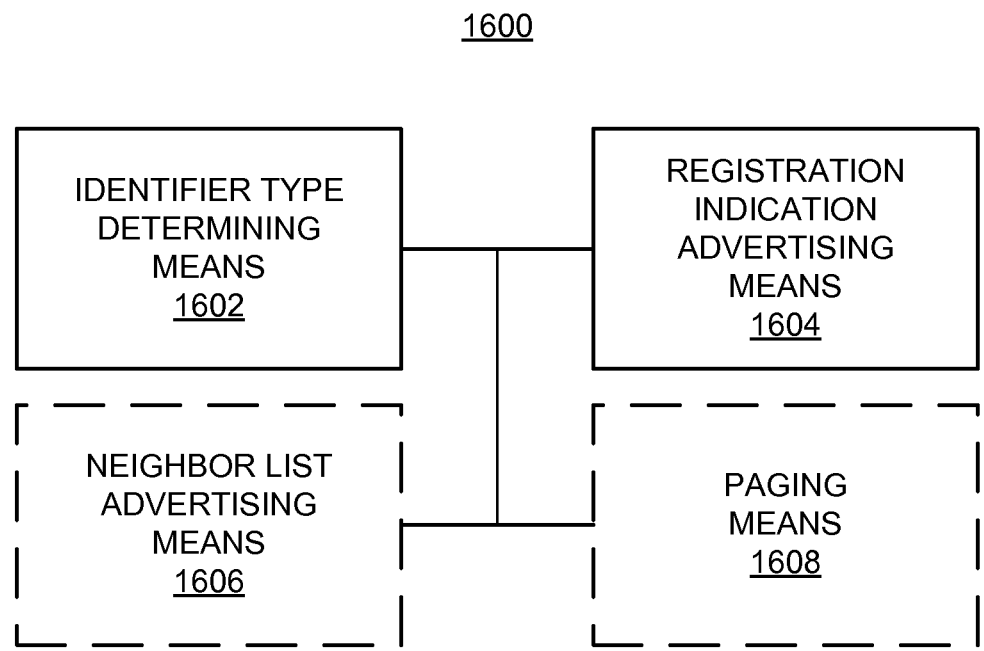

The teachings herein may be incorporated into a node (e.g., a device) employing various components for communicating with at least one other node. FIG. 10 depicts several sample components that may be employed to facilitate communication between nodes. Specifically, FIG. 10 illustrates a wireless device 1010 (e.g., an access point) and a wireless device 1050 (e.g., an access terminal) of a MIMO system 1000. At the device 1010, traffic data for a number of data streams is provided from a data source 1012 to a transmit ("TX") data processor 1014.

In some aspects, each data stream is transmitted over a respective transmit antenna. The TX data processor 1014 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1030. A data memory 1032 may store program code, data, and other information used by the processor 1030 or other components of the device 1010.

The modulation symbols for all data streams are then provided to a TX MIMO processor 1020, which may further process the modulation symbols (e.g., for OFDM). The TX MIMO processor 1020 then provides $N_T$ modulation symbol streams to $N_T$ transceivers ("XCVR") 1022A through 1022T. In some aspects, the TX MIMO processor 1020 applies beam-forming weights to the symbols of the data streams and to the antenna from which the symbol is being transmitted.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022A through 1022T are then transmitted from $N_T$ antennas 1024A through 1024T, respectively.

At the device 1050, the transmitted modulated signals are received by $N_R$ antennas 1052A through 1052R and the received signal from each antenna 1052 is provided to a respective transceiver ("XCVR") 1054A through 1054R. Each transceiver 1054 conditions (e.g., filters, amplifies, and downconverts) a respective received signal, digitizes the conditioned signal to provide samples, and further processes the samples to provide a corresponding "received" symbol stream.

A receive ("RX") data processor 1060 then receives and processes the $N_R$ received symbol streams from $N_R$ transceivers 1054 based on a particular receiver processing technique to provide $N_T$ "detected" symbol streams. The RX data processor 1060 then demodulates, deinterleaves, and decodes each detected symbol stream to recover the traffic data for the data stream. The processing by the RX data processor 1060 is complementary to that performed by the TX MIMO processor 1020 and the TX data processor 1014 at the device 1010.

A processor 1070 periodically determines which pre-coding matrix to use (discussed below). The processor 1070 formulates a reverse link message comprising a matrix index portion and a rank value portion. A data memory 1072 may store program code, data, and other information used by the processor 1070 or other components of the device 1050.

The reverse link message may comprise various types of information regarding the communication link and/or the received data stream. The reverse link message is then processed by a TX data processor 1038, which also receives traffic data for a number of data streams from a data source 1036, modulated by a modulator 1080, conditioned by the transceivers 1054A through 1054R, and transmitted back to the device 1010.

At the device 1010, the modulated signals from the device 1050 are received by the antennas 1024, conditioned by the transceivers 1022, demodulated by a demodulator ("DE-MOD") 1040, and processed by a RX data processor 1042 to extract the reverse link message transmitted by the device 1050. The processor 1030 then determines which pre-coding matrix to use for determining the beam-forming weights then processes the extracted message.

FIG. 10 also illustrates that the communication components may include one or more components that perform paging and/or registration control operations as taught herein. For example, a paging control component 1090 may cooperate with the processor 1030 and/or other components of the device 1010 to send/receive paging and/or registration signals to/from another device (e.g., device 1050) as taught herein. Similarly, a paging control component 1092 may cooperate with the processor 1070 and/or other components of the device 1050 to send/receive paging and/or registration signals to/from another device (e.g., device 1010). It should be appreciated that for each device 1010 and 1050 the functionality of two or more of the described components may be provided by a single component. For example, a single processing component may provide the functionality of the paging control component 1090 and the processor 1030 and a single processing component may provide the functionality of the paging control component 1092 and the processor 1070.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA"), cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7) technology, as well as 3GPP2 (1xRTT, 1xEV-DO RelO, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The components described herein may be implemented in a variety of ways. Referring to FIGS. 11-16, apparatuses 1100, 1200, 1300, 1400, 1500, and 1600 are represented as a series of interrelated functional blocks. In some aspects the functionality of these blocks may be implemented as a processing system including one or more processor components. In some aspects the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. In some aspects one or more of the dashed blocks in FIGS. 11-16 are optional.

The apparatuses 1100, 1200, 1300, 1400, 1500, and 1600 may include one or more modules that may perform one or more of the functions described above with regard to various figures. For example, a registering means 1102 may correspond to, for example, a registration controller as discussed herein. A receiving means 1104 may correspond to, for example, a receiver as discussed herein. A node identifying means 1106 may correspond to, for example, a node identifier as discussed herein. An identifier determining means 1108 may correspond to, for example, an identifier determiner as discussed herein. A suggested paging set defining/generating means 1110 may correspond to, for example, a list generator as discussed herein. A providing means 1112 may correspond to, for example, a transmitter as discussed herein. A registration request receiving means 1202 may correspond to, for example, a registration controller as discussed herein. A list providing means 1204 may correspond to, for example, a list generator as discussed herein. A page request sending means 1206 may correspond to, for example, a paging controller as discussed herein. A mobility determining means 1208 may correspond to, for example, a list generator as discussed herein. A suggested paging set receiving means 1210 may correspond to, for example, a paging controller as discussed herein. A list determining means 1302 may correspond to, for example, a list generator as discussed herein. A list providing means 1304 may correspond to, for example, a registration controller as discussed herein. An information receiving means 1306 may correspond to, for example, a list generator as discussed herein. A node identifying means 1308 may correspond to, for example, a list generator as discussed herein. A list receiving means 1310 may correspond to, for example, a registration controller as discussed herein. An identifier determining means 1312 may correspond to, for example, a node identifier as discussed herein. An indication receiving means 1314 may correspond to, for example, a receiver as discussed herein. A registration request receiving means 1402 may correspond to, for example, a registration controller as discussed herein. A node identifying means 1404 may correspond to, for example, a list generator as discussed herein. A page request sending means 1406 may correspond to, for example, a paging controller as discussed herein. A mobility determining means 1408 may correspond to, for example, a list generator as discussed herein. A node information receiving means 1502 may correspond to, for example, a receiver as discussed herein. A list determining means 1504 may correspond to, for example, a list generator as discussed herein. A list providing means 1506 may correspond to, for example, a registration controller as discussed herein. A node identifying means 1508 may correspond to, for example, a node identifier as discussed herein. A list receiving means 1510 may correspond to, for example, a registration controller as discussed herein. An identifier determining means 1512 may correspond to, for example, a node identifier as discussed herein. A registration deciding means 1514 may correspond to, for example, a registration controller as discussed herein. An indication receiving means 1516 may correspond to, for example, a receiver as discussed herein. An identifier type determining means 1602 may correspond to, for example, an identifier determiner as discussed herein. A registration indication advertising means 1604 may correspond to, for example, a transmitter as discussed herein. A neighbor list advertising means 1606 may correspond to, for example, a transmitter as discussed herein. A paging means 1608 may correspond to, for example, a paging controller as discussed herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

In view of the above, in some aspects a first method of communication comprises: determining whether to use a first type of identifier or a second type identifier for registration at a first node; and advertising an indication for registration at the first node, wherein the indication implies that the second type of identifier and not the first type identifier shall be used for registration. In addition, in some aspects at least one of the following also may apply to the first method of communication: the first type of identifier relates to a zone, a subscriber group, or a location; the second type of identifier: uniquely identifies the first node, is a cell identifier, or is a shared identifier for a set of nodes that includes the first node; the shared identifier is a subscriber group; the indication is set to a value defined for the first type of identifier or the second type of identifier; the first type of identifier corresponds to a location that is used to trigger registration at the first node by a second node based on a distance between that location and another location associated with a prior registration of the second node, and the indication indicates that distance based registration is disabled; the determination comprises receiving configuration information from a configuration manager; the determination is based on a node type of the first node; the first node comprises a femto node or a pico node; the method further comprises advertising a list of at least one neighboring femto node or pico node; the method further comprises advertising a list of at least one neighboring macro node; the first node is restricted to not provide, for at least one node, at least one of the group consisting of: signaling, data access, registration, and paging; the method further comprises paging a second node if the second node: included an identifier of the first node in a suggested paging set, and provided the suggested paging set to at least one mobility manager that manages paging at the first node; the indication further implies that the first node will not page a second node unless the second node requests to be paged by the first node; the determination comprises determining whether the first node is part of a paging set of nodes; the indication further implies that the first node will not induce neighboring nodes to page a second node; the determination comprises determining whether the first node is part of a paging set of nodes.

In some aspects a second method of communication comprises: registering at a first node; and receiving at a second node, as a result of the registration, a list comprising identifiers of nodes that will page the second node, wherein the identifiers comprise at least one first type of identifier and at least one second type of identifier. In addition, in some aspects at least one of the following also may apply to the second method of communication: the first type of identifier comprises an identifier of an individual node, a cell identifier, or an identifier of a subscriber group; the second type of identifier relates to a zone, a tracking area, a subscriber group, or a location; the method further comprises identifying a third node, determining whether an identifier of the first type for the third node is on the list and whether an identifier of the second type for the third node is on the list, and deciding, based on the determination, whether to register at the third node; the identifier of the first type for the third node uniquely identifies the third node or relates to a subscriber group that includes the third node, and the identifier of the second type for the third node relates to a zone that includes the third node, a subscriber group that includes the third node, or a location of the third node; the deciding comprises electing to not register at the third node if the identifier of the first type for the third node is on the list or if the identifier of the second type for the third node is on the list; the identification of the third node comprises determining that the second node is idling at the third node; the method further comprises receiving an indication relating to registration at a third node, wherein the indication implies that an identifier of the first type and not an identifier of the second type shall be used for the registration;

the first type of identifier comprises a cell identifier or a subscriber group, and the second type of identifier relates to a zone, a tracking area, or a location; the method further comprises defining, in response to the received indication, a suggested paging set comprising another identifier of the first type and providing the suggested paging set to a mobility manager that manages paging at the third node; the method further comprises generating, at the second node, a suggested paging set comprising at least one identifier of the first type; the list comprises the at least one identifier from the suggested paging set; the first node comprises a femto node or a pico node; the first node is restricted to not provide, for at least one node, at least one of the group consisting of: signaling, data access, registration, and paging.

In some aspects a third method of communication comprises: receiving a registration request from a first node; and providing, in a response to the registration request, a list comprising identifiers of nodes that will page the first node, wherein the identifiers comprise at least one first type of identifier and at least one second type of identifier. In addition, in some aspects at least one of the following also may apply to the third method of communication: the first type of identifier comprises an identifier of an individual node, a cell identifier, or an identifier of a subscriber group; the second type of identifier relates to a zone, a subscriber group, or a location; the method further comprises sending a page request to each node identified by the at least one first type of identifier and the at least one second type of identifier; providing the list comprises identifying at least one node for the list based on a location of the first node; providing the list comprises identifying at least one node for the list based on mobility of the first node; a size of a paging area for the first node is based on the mobility of the first node; the method further comprises determining the mobility of the first node by receiving mobility information from the first node; providing the list comprises identifying at least one node for the list based on where the first node previously established a connection; providing the list comprises identifying at least one neighbor of a second node at which the first node registered; providing the list comprises identifying at least one node for the list based on a time of day; providing the list comprises identifying at least one node for the list based on an application associated with the first node; providing the list comprises identifying at least one node for the list based on how frequently the first node is paged; a size of a paging area for the first node is inversely related to how frequently the first node is paged; providing the list comprises identifying at least one node for the list based on a frequency band over which the first node is paged; providing the list comprises identifying at least one node for the list based on an association of the first node with at least one other node; if the first node is registered at a macro node, providing the list comprises excluding from the list any nodes from an underlay network; if the first node is registered at a femto node or a pico node, providing the list comprises excluding from the list any macro nodes that are not neighbors of the femto node or the pico node; the method further comprises receiving a suggested paging set from the first node in conjunction with the registration request, wherein providing the list comprises defining the list based on the suggested paging set; the suggested paging set comprises the first type of identifier and/or the second type of identifier; the first type of identifier comprises a cell identifier or a subscriber group; the second type of identifier relates to a zone, a subscriber group, or a location; the list comprises a subset of the suggested paging set; the first type of identifier identifies a femto node or a pico node; the first type of identifier identifies a node that is restricted to not provide, for at least one node, at least one of the group consisting of: signaling, data access, registration, and paging; providing the list comprises restricting the list to nodes of a single zone.

In some aspects a fourth method of communication comprises: receiving a registration request from a first node; and providing, in a response to the registration request, a list comprising at least one first type of identifier of an individual node. In addition, in some aspects at least one of the following also may apply to the fourth method of communication: the first type of identifier comprises a cell identifier; the list further comprises at least one second type of identifier of a plurality of nodes; the second type of identifier relates to a zone, a subscriber group, or a location; the method further comprises sending a page request to each node identified by the at least one first type of identifier and the at least one second type of identifier; providing the list comprises identifying at least one node for the list based on a location of the first node; providing the list comprises identifying at least one node for the list based on mobility of the first node; a size of a paging area for the first node is based on the mobility of the first node; the method further comprises determining the mobility of the first node by receiving mobility information from the first node; providing the list comprises identifying at least one node for the list based on where the first node previously established a connection; providing the list comprises identifying at least one neighbor of a second node at which the first node registered; providing the list comprises identifying at least one node for the list based on a time of day; providing the list comprises identifying at least one node for the list based on an application associated with the first node; providing the list comprises identifying at least one node for the list based on how frequently the first node is paged; a size of a paging area for the first node is inversely related to how frequently the first node is paged; providing the list comprises identifying at least one node for the list based on a frequency band over which the first node is paged; providing the list comprises identifying at least one node for the list based on an association of the first node with at least one other node; if the first node is registered at a macro node, providing the list comprises excluding from the list any nodes from an underlay network; if the first node is registered at a femto node or a pico node, providing the list comprises excluding from the list any macro nodes that are not neighbors of the femto node or the pico node; the method further comprises receiving a suggested paging set from the first node in conjunction with the registration request, wherein providing the list comprises defining the list based on the suggested paging set; the suggested paging set comprises the first type of identifier and/or a second type of identifier; the first type of identifier comprises a cell identifier; the second type of identifier relates to a zone, a subscriber group, or a location; the list comprises a subset of the suggested paging set; the individual node comprises a femto node or a pico node; the individual node is restricted to not provide, for at least one node, at least one of the group consisting of: signaling, data access, registration, and paging; providing the list comprises restricting the list to nodes of a single zone.

In some aspects a fifth method of communication comprises: determining a list comprising identifiers of nodes where a first node wishes to be paged, wherein the identifiers comprise at least one first type of identifier and at least one second type of identifier; and providing the list in conjunction with registering the first node. In addition, in some aspects at least one of the following also may apply to the fifth method of communication: the first type of identifier comprises an identifier of an individual node, a cell identifier, or an identifier of a subscriber group; the second type of identifier relates to a zone, a subscriber group, or a location; the method further comprises receiving information that identifies at least one neighboring node, wherein the determination of the list is based on the identified at least one neighboring node; the information is received from a mobility manager that manages paging for the first node; the method further comprises identifying at least one neighboring node based on received radio frequency signals, wherein the determination of the list is based on the identified at least one neighboring node; the determination of the list comprises identifying at least one node for the list based on a location of the first node; the determination of the list comprises identifying at least one node at which the first node previously established a connection; the determination of the list comprises identifying at least one node for the list based on a time of day; the determination of the list comprises identifying at least one node for the list based on an application associated with the first node; the determination of the list comprises identifying at least one node for the list based on how frequently the first node is paged; the determination of the list comprises identifying at least one node for the list based on a frequency band over which the first node is paged; the determination of the list comprises identifying at least one node that is associated with the first node; the determination of the list comprises adding an identifier of a home femto node to the list if the first node is near a home macro node; the determination of the list comprises adding an identifier of a home femto node to the list if the first node receives radio frequency signals from a home femto node; the list is restricted to only include nodes from a single zone; the list is provided to a mobility manager that manages paging for the first node; the method further comprises receiving, as a result of the registering, another list comprises the first type of identifier and/or the second type of identifier; the method further comprises identifying a second node, determining whether an identifier of the first type for the second node is on the another list and whether an identifier of the second type for the second node is on the another list, and deciding, based on the determination, whether to register at the second node; the identifier of the first type for the second node uniquely identifies the second node or relates to a subscriber group that includes the second node, and the identifier of the second type for the second node relates to a zone that includes the second node, a subscriber group that includes the second node, or a location of the second node; the method further comprises receiving an indication relating to registration at a second node, wherein the indication implies that an identifier of the first type and not an identifier of the second type shall be used for the registration; the first type of identifier comprises a cell identifier or subscriber group, and the second type of identifier relates to a zone, a subscriber group, or a location; the indication further implies that the second node will not page the first node unless the first node requests to be paged by the second node; the indication further implies that the second node will not induce neighboring nodes to page the first node; the first type of identifier identifies a femto node or a pico node; the first type of identifier identifies a node that is restricted to not provide, for at least one node, at least one of the group consisting of: signaling, data access, registration, and paging.

In some aspects a sixth method of communication comprises: receiving a registration request from a first node; receiving, in conjunction with the registration request, a list comprising identifiers of nodes where the first node wishes to be paged, wherein the identifiers comprise at least one first type of identifier and at least one second type of identifier; identifying a set of nodes based on the list; and sending, to the set of nodes, at least one request to page the first node. In addition, in some aspects at least one of the following also may apply to the sixth method of communication: the first type of identifier comprises an identifier of an individual node, a cell identifier, or an identifier of a subscriber group; the second type of identifier relates to a zone, a subscriber group, or a location; the registration request includes the list; the method further comprises determining a paging set that identifies at least one node for paging the first node, wherein the identification of the set of nodes is further based on the paging set; the paging set comprises at least one other first type of identifier and/or at least one other second type of identifier; the first type of identifier comprises an identifier of an individual node, a cell identifier, or an identifier of a subscriber group, and the second type of identifier relates to a zone, a subscriber group, or a location; the determination of the paging set comprises obtaining the paging set from the list; the determination of the paging set comprises identifying at least one node for the paging set based on a node at which the first node registered; the determination of the paging set comprises identifying at least one node for the paging set based on a location of the first node; the determination of the paging set comprises identifying at least one node for the paging set based on mobility of the first node; a size of a paging area for the first node is based on the mobility of the first node; the method further comprises determining the mobility of the first node by receiving mobility information from the first node; the determination of the paging set comprises identifying at least one node for the paging set based on where the first node previously established a connection; the determination of the paging set comprises identifying at least one neighbor of a second node at which the first node registered; the determination of the paging set comprises identifying at least one node for the paging set based on a time of day; the determination of the paging set comprises identifying at least one node for the paging set based on an application associated with the first node; the determination of the paging set comprises identifying at least one node for the paging set based on how frequently the first node is paged; a size of a paging area for the first node is inversely related to how frequently the first node is paged; the determination of the paging set comprises identifying at least one node for the paging set based on a frequency band over which the first node is paged; the determination of the paging set comprises identifying at least one node for the paging set based on an association of the first node with at least one other node; if the first node is registered at a macro node, the determination of the paging set comprises excluding from the paging set any nodes from an underlay network; if the first node is registered at a femto node or a pico node, the determination of the paging set comprises excluding from the paging set any macro nodes that are not neighbors of the femto node or the pico node; the set of nodes includes at least a portion of any nodes identified by the list; the method further comprises generating another list based on the set of nodes, and sending the another list to the first node in response to the registration; the first type of identifier identifies a femto node or a pico node; the first type of identifier identifies a node that is restricted to not provide, for at least one node, at least one of the group consisting of: signaling, data access, registration, and paging.

In some aspects a seventh method of communication comprises: receiving, at a first node, information that identifies at least one neighboring node of a second node; determining, based on the received information, a list identifying at least one node where the first node wishes to be paged; and providing the list in conjunction with registering the first node. In addition, in some aspects at least one of the following also may apply to the seventh method of communication: the list comprises at least one first type of identifier and at least one second type of identifier; the first type of identifier comprises an identifier of an individual node, a cell identifier, or an identifier of a subscriber group; the second type of identifier relates to a zone, a subscriber group, or a location; the information is received from the second node; the information is received from a mobility manager that manages paging for the first node; the method further comprises identifying at least one other neighboring node based on received radio frequency signals, wherein the determination of the list is further based on the identified at least one other neighboring node; the determination of the list comprises identifying at least one node for the list based on a location of the first node; the determination of the list comprises identifying at least one node at which the first node previously established a connection; the determination of the list comprises identifying at least one node for the list based on a time of day; the determination of the list comprises identifying at least one node for the list based on an application associated with the first node; the determination of the list comprises identifying at least one node for the list based on how frequently the first node is paged; the determination of the list comprises identifying at least one node for the list based on a frequency band over which the first node is paged; the determination of the list comprises identifying at least one node that is associated with the first node; the determination of the list comprises adding an identifier of a home femto node to the list if the first node is near a home macro node; the determination of the list comprises adding an identifier of a home femto node to the list if the first node receives radio frequency signals from a home femto node; the list is provided to a mobility manager that manages paging for the first node; the method further comprises receiving, as a result of the registering, another list comprising a first type of identifier and/or a second type of identifier; the method further comprises identifying a third node, determining whether an identifier of the first type for the third node is on the another list and whether an identifier of the second type for the third node is on the another list, and deciding, based on the determination, whether to register at the third node; the identifier of the first type for the third node uniquely identifies the third node or relates to a subscriber group that includes the third node, and the identifier of the second type for the third node relates to a zone that includes the third node, a subscriber group that includes the third node, or a location of the third node; the method further comprises receiving an indication relating to registration at a third node, wherein the indication implies that an identifier of the first type and not an identifier of the second type shall be used for the registration; the first type of identifier comprises an identifier of an individual node, a cell identifier, or an identifier of a subscriber group, and the second type of identifier relates to a zone, a subscriber group, or a location; the indication further implies that the third node will not page the first node unless the first node requests to be paged by the third node; the indication further implies that the third node will not induce neighboring nodes to page the first node; the second node is a femto node or a pico node; the second node is restricted to not provide, for at least one node, at least one of the group consisting of: signaling, data access, registration, and paging.

In some aspects, functionality corresponding to one or more of the above aspects relating to the first, second, third, fourth, fifth, sixth, and seventh methods of communication may be implemented, for example, in an apparatus using structure as taught herein. In addition, a computer-program product may comprise codes configured to cause a computer to provide functionality corresponding to one or more of the above aspects relating to the first, second, third, fourth, fifth, sixth, and seventh methods of communication.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   registering, by an access terminal, with a first access point;
   generating, by the access terminal, a suggested paging set indicating a set of nodes by which the access terminal wishes to be paged;
   receiving, by the access terminal, as a result of the registration, a list comprising identifiers of nodes that will page the access terminal, wherein the list is determined based at least in part on the suggested paging set, and the identifiers of nodes comprise at least one first type of identifier and at least one second type of identifier, wherein the second type of identifier relates to a tracking area; and
   receiving, by the access terminal, an indication relating to registration at a second access point, wherein the indication implies that an identifier of the first type is to be used for the registration at the second access point.

2. The method of claim 1, wherein the first type of identifier comprises an identifier of an individual node, a cell identifier, or an identifier of a subscriber group.

3. The method of claim 1, further comprising:
   defining, in response to the received indication, the suggested paging set to comprise another identifier of the first type associated with at least one node of the set of nodes; and
   providing the suggested paging set to a mobility manager that manages paging at the second access point.

4. The method of claim 1, wherein the suggested paging set comprises at least one identifier of the first type associated with at least one node of the set of nodes, wherein the list comprises the at least one identifier from the suggested paging set.

5. An access terminal for wireless communication, comprising:
   a registration controller configured to register with a first access point;
   a list generator configured to generate a suggested paging set indicating a set of nodes by which the access terminal wishes to be paged; and
   a receiver configured to receive, as a result of the registration, a list comprising identifiers of nodes that will page the access terminal, wherein the list is determined based at least in part on the suggested paging set, and the identifiers of nodes comprise at least one first type of identifier and at least one second type of identifier, wherein the second type of identifier relates to a tracking area,
   wherein:
   the registration controller is further configured to receive an indication relating to registration at a second access point; and
   the indication implies that an identifier of the first type is to be used for the registration at the second access point.

6. The access terminal of claim 5, wherein the first type of identifier comprises an identifier of an individual node, a cell identifier, or an identifier of a subscriber group.

7. The access terminal of claim 5, wherein:
the list generator is configured to define, in response to the received indication, the suggested paging set to comprise another identifier of the first type associated with at least o ne node of the set of nodes; and
further comprising a transmitter configured to provide the suggested paging set to a mobility manager that manages paging at the second access point.

8. The access terminal of claim 5, wherein the suggested paging set comprises at least one identifier of the first type associated with at least one node of the set of nodes, wherein the list comprises the at least one identifier from the suggested paging set.

9. An apparatus for wireless communication, comprising:
means for registering, by an access terminal, with a first access point;
means for generating, by the access terminal, a suggested paging set indicating a set of nodes by which the access terminal wishes to be paged; and
means for receiving, by the access terminal, as a result of the registration, a list comprising identifiers of nodes that will page the access terminal, wherein the list is determined based at least in part on the suggested paging set, and the identifiers of nodes comprise at least one first type of identifier and at least one second type of identifier, wherein the second type of identifier relates to a tracking area,
wherein:
the means for registering is configured to receive an indication relating to registration at a second access point; and
the indication implies that an identifier of the first type is to be used for the registration at the second access point.

10. The apparatus of claim 9, wherein the first type of identifier comprises an identifier of an individual node, a cell identifier, or an identifier of a subscriber group.

11. The apparatus of claim 9, further comprising:
means for defining, in response to the received indication, the suggested paging set to comprise another identifier of the first type associated with at least one node of the set of nodes; and
means for providing the suggested paging set to a mobility manager that manages paging at the second access point.

12. The apparatus of claim 9, wherein the suggested paging set comprises at least one identifier of the first type associated with at least one node of the set of nodes, wherein the list comprises the at least one identifier from the suggested paging set.

13. A non-transitory computer-readable medium, comprising:
code for causing a computer to:
register by an access terminal, with a first access point;
generate, by the access terminal, a suggested paging set indicating a set of nodes by which the access terminal wishes to be paged;
receive, by the access terminal, as a result of the registration, a list comprising identifiers of nodes that will page the access terminal, wherein the list is determined based at least in part on the suggested paging set, and the identifiers of nodes comprise at least one first type of identifier and at least one second type of identifier, the second type of identifier relates to a tracking area; and
receive, by the access terminal, an indication relating to registration at a second access point, wherein the indication implies that an identifier of the first type is to be used for the registration at the second access point.

14. The non-transitory computer-readable medium of claim 13, wherein
the first type of identifier comprises an identifier of an individual node, a cell identifier, or an identifier of a subscriber group.

15. A method of communication, comprising:
receiving, by a first access point, a registration request from an access terminal;
receiving, from the access terminal, a suggested paging set indicating a set of nodes by which the access terminal wishes to be paged; and
providing, by the first access point, in a response to the registration request, a list comprising identifiers of nodes that will page the access terminal, wherein the list is determined based at least in part on the suggested paging set, and wherein the identifiers of nodes comprise at least one first type of identifier and at least one second type of identifier, wherein the second type of identifier relates to a tracking area;
wherein an indication relating to registration at a second access point is provided to the access terminal, the indication implying that an identifier of the first type is to be used for the registration at the second access point.

16. The method of claim 15, wherein the first type of identifier comprises an identifier of an individual node, a cell identifier, or an identifier of a subscriber group.

17. The method of claim 15, wherein providing the list comprises identifying at least one node for the list based on mobility of the access terminal.

18. The method of claim 17, wherein a size of a paging area for the access terminal is based on the mobility of the access terminal.

19. The method of claim 15, wherein providing the list comprises identifying at least one node for the list based on how frequently the access terminal is paged.

20. The method of claim 15, wherein, if the access terminal is registered at a macro node, providing the list comprises excluding from the list any nodes from an underlay network.

21. The method of claim 15, wherein, if the access terminal is registered at a femto node or a pico node, providing the list comprises excluding from the list any macro nodes that are not neighbors of the femto node or the pico node.

22. An access point for communication, comprising:
a registration controller configured to receive a registration request from an access terminal, the registration controller further configured to receive, from the access terminal, a suggested paging set indicating a set of nodes by which the access terminal wishes to be paged; and
a list generator configured to provide, in a response to the registration request, a list comprising identifiers of nodes that will page the access terminal, wherein the list is determined based at least in part on the suggested paging set, and wherein the identifiers of the nodes comprise at least one first type of identifier and at least one second type of identifier, wherein the second type of identifier relates to a tracking area,
wherein an indication relating to registration at a second access point is provided to the access terminal, the indication implying that an identifier of the first type is to be used for the registration at the second access point.

23. The access point of claim 22, wherein the first type of identifier comprises an identifier of an individual node, a cell identifier, or an identifier of a subscriber group.

24. The access point of claim 22, wherein providing the list comprises identifying at least one node for the list based on mobility of the first node.

25. The access point of claim 22, wherein providing the list comprises identifying at least one node for the list based on how frequently the access terminal is paged.

26. The access point of claim 22, wherein, if the access terminal is registered at a macro node, providing the list comprises excluding from the list any nodes from an underlay network.

27. The access point of claim 22, wherein, if the access terminal is registered at a femto node or a pico node, providing the list comprises excluding from the list any macro nodes that are not neighbors of the femto node or the pico node.

28. An apparatus for communication, comprising:
means for receiving, by a first access point, a registration request from an access terminal, the means for receiving configured to receive, from the access terminal, a suggested paging set indicating a set of nodes by which the access terminal wishes to be paged; and
means for providing, by the first access point, in a response to the registration request, a list comprising identifiers of nodes that will page the access terminal, wherein the list is determined based at least in part on the suggested paging set, and wherein the identifiers of the nodes comprise at least one first type of identifier and at least one second type of identifier, wherein the second type of identifier relates to a tracking area,
wherein an indication relating to registration at a second access point is provided to the access terminal, the indication implying that an identifier of the first type is to be used for the registration at the second access point.

29. The apparatus of claim 28, wherein the first type of identifier comprises an identifier of an individual node, a cell identifier, or an identifier of a subscriber group.

30. The apparatus of claim 28, wherein providing the list comprises identifying at least one node for the list based on mobility of the access terminal.

31. The apparatus of claim 28, wherein providing the list comprises identifying at least one node for the list based on how frequently the access terminal is paged.

32. The apparatus of claim 28, wherein, if the access terminal is registered at a macro node, providing the list comprises excluding from the list any nodes from an underlay network.

33. The apparatus of claim 28, wherein, if the access terminal is registered at a femto node or a pico node, providing the list comprises excluding from the list any macro nodes that are not neighbors of the femto node or the pico node.

34. A non-transitory computer-readable medium, comprising:
code for causing a computer to:
receive, by a first access point, a registration request from an access terminal;
receive, by the first access point, from the access terminal, a suggested paging set indicating a set of nodes by which the access terminal wishes to be paged; and
provide, by the first access point, in a response to the registration request, a list comprising identifiers of nodes that will page the access terminal, wherein the list is determined based at least in part on the suggested paging set, and wherein the identifiers of nodes comprise at least one first type of identifier and at least one second type of identifier, wherein the second type of identifier relates to a tracking area,
wherein an indication relating to registration at a second access point is provided to the access terminal, the indication implying that an identifier of the first type is to be used for the registration at the second access point.

35. The non-transitory computer-readable medium of claim 34, wherein
the first type of identifier comprises an identifier of an individual node, a cell identifier, or an identifier of a subscriber group.

36. A method of communication, comprising:
receiving, by a first access point, a registration request from an access terminal;
receiving, by the first access point, from the access terminal, a suggested paging set indicating a set of nodes by which the access terminal wishes to be paged; and
providing, in a response to the registration request, a list comprising at least one first type of identifier of an individual node and at least one second type of identifier, wherein the second type of identifier relates to a tracking area, wherein the list is determined based at least in part on the suggested paging set, and wherein providing the list comprises identifying at least one node for the list based on how frequently the access terminal is paged,
wherein an indication relating to registration at a second access point is provided to the access terminal, the indication implying that an identifier of the first type is to be used for the registration at the second access point.

37. The method of claim 36, wherein the first type of identifier comprises a cell identifier.

38. The method of claim 36, wherein:
if the access terminal is registered at a macro node, providing the list comprises excluding from the list any nodes from an underlay network; and
if the access terminal is registered at a femto node or a pico node, providing the list comprises excluding from the list any macro nodes that are not neighbors of the femto node or the pico node.

39. An access point for communication, comprising:
a registration controller configured to receive a registration request from an access terminal and a suggested paging set indicating a set of nodes by which the access terminal wishes to be paged; and
a list generator configured to provide, in a response to the registration request, a list comprising at least one first type of identifier of an individual node and at least one second type of identifier, wherein the second type of identifier relates to a tracking area, wherein the list is determined based at least in part on the suggested paging set, and wherein providing the list comprises identifying at least one node for the list based on how frequently the access terminal is paged,
wherein an indication relating to registration at a second access point is provided to the access terminal, the indication implying that an identifier of the first type is to be used for the registration at the second access point.

40. The access point of claim 39, wherein the first type of identifier comprises a cell identifier.

41. The access point of claim 39, wherein:
if the access terminal is registered at a macro node, providing the list comprises excluding from the list any nodes from an underlay network; and
if the access terminal is registered at a femto node or a pico node, providing the list comprises excluding from the list any macro nodes that are not neighbors of the femto node or the pico node.

42. An apparatus for communication, comprising:
- means for receiving, by a first access point, a registration request from an access terminal and a suggested paging set indicating a set of nodes by which the access terminal wishes to be paged; and
- means for providing, by the first access point, in a response to the registration request, a list comprising at least one first type of identifier of an individual node, and at least one second type of identifier, wherein the second type of identifier relates to a tracking area, wherein the list is determined based at least in part on the suggested paging set, and wherein providing the list comprises identifying at least one node for the list based on how frequently the access terminal is paged,
- wherein an indication relating to registration at a second access point is provided to the access terminal, the indication implying that an identifier of the first type is to be used for the registration at the second access point.

43. The apparatus of claim 42, wherein the first type of identifier comprises a cell identifier.

44. The apparatus of claim 42, wherein:
- if the access terminal is registered at a macro node, providing the list comprises excluding from the list any nodes from an underlay network; and
- if the access terminal is registered at a femto node or a pico node, providing the list comprises excluding from the list any macro nodes that are not neighbors of the femto node or the pico node.

45. A non-transitory computer-readable medium, comprising:
- code for causing a computer to:
  - receive, by a first access point, a registration request from an access terminal;
  - receive, by the first access point, from the access terminal, a suggested paging set indicating a set of nodes by which the access terminal wishes to be paged; and
  - provide, in a response to the registration request, a list comprising at least one first type of identifier of an individual node, and at least one second type of identifier, wherein the second type of identifier relates to a tracking area, wherein the list is determined based at least in part on the suggested paging set, and wherein providing the list comprises identifying at least one node for the list based on how frequently the access terminal is paged,
- wherein an indication relating to registration at a second access point is provided to the access terminal, the indication implying that an identifier of the first type is to be used for the registration at the second access point.

46. The non-transitory computer-readable medium of claim 45, wherein the first type of identifier comprises a cell identifier.

* * * * *